United States Patent
Gardiner

(10) Patent No.: US 12,486,920 B2
(45) Date of Patent: Dec. 2, 2025

(54) SIPHON SYSTEMS AND VACUUM PUMPS

(71) Applicant: Thomas Falkland Gardiner, Waimauku (NZ)

(72) Inventor: Thomas Falkland Gardiner, Waimauku (NZ)

(*) Notice: Subject to any disclaimer, the term of this patent is extended or adjusted under 35 U.S.C. 154(b) by 76 days.

(21) Appl. No.: 18/263,336

(22) PCT Filed: Jan. 28, 2022

(86) PCT No.: PCT/NZ2022/050010
§ 371 (c)(1),
(2) Date: Jul. 27, 2023

(87) PCT Pub. No.: WO2022/164331
PCT Pub. Date: Aug. 4, 2022

(65) Prior Publication Data
US 2024/0077144 A1 Mar. 7, 2024

(30) Foreign Application Priority Data
Jan. 28, 2021 (NZ) .................................. 772395

(51) Int. Cl.
*F16K 21/18* (2006.01)
*F04B 37/14* (2006.01)
(Continued)

(52) U.S. Cl.
CPC .............. *F16K 21/18* (2013.01); *F04B 37/14* (2013.01); *F04F 10/00* (2013.01); *F16K 31/28* (2013.01)

(58) Field of Classification Search
CPC .......... F16K 21/18; F16K 21/20; F16K 31/20; F04F 10/00; F04F 10/02; Y10T 137/2842;
(Continued)

(56) References Cited

U.S. PATENT DOCUMENTS 529,512 A * 11/1894 Wash et al. ............. F04F 10/00
    137/132
1,493,464 A * 5/1924 Brotz ..................... B60K 15/00
    137/131
(Continued)

FOREIGN PATENT DOCUMENTS

CN      101586583 A     11/2009
DE      282209 C     8/1913
(Continued)

OTHER PUBLICATIONS

International Search Report and Written Opinion for PCT/NZ2022/050010 (May 2, 2022).

*Primary Examiner* — Reinaldo Sanchez-Medina
(74) *Attorney, Agent, or Firm* — Merchant & Gould P.C.

(57) ABSTRACT

A vacuum pump for use with a siphon system to continuously purge gases that accumulate in a high point of the siphon system, or for priming the inlet to a pump, or to create vacuum for another purpose. Siphon systems require regular purging of gases when operating for long periods of time. The vacuum pump provides a mechanism that operates in a cycling manner. A first stage of the cycle involves filling a chamber using a pressurised liquid supply, and purging all gases from the chamber. A second stage involves isolating the chamber from the surrounding environment, and then allowing the liquid in the chamber to drain into the siphon system, while at the same time gases from within the siphon system are allowed to enter the chamber. Once the liquid has drained from the chamber, the chamber is isolated from the siphon system, and the liquid filling stage is repeated. Continual cycling of this process can purge the siphon system of gases, or be used to produce a vacuum for other purposes.

19 Claims, 14 Drawing Sheets

Figure 1:
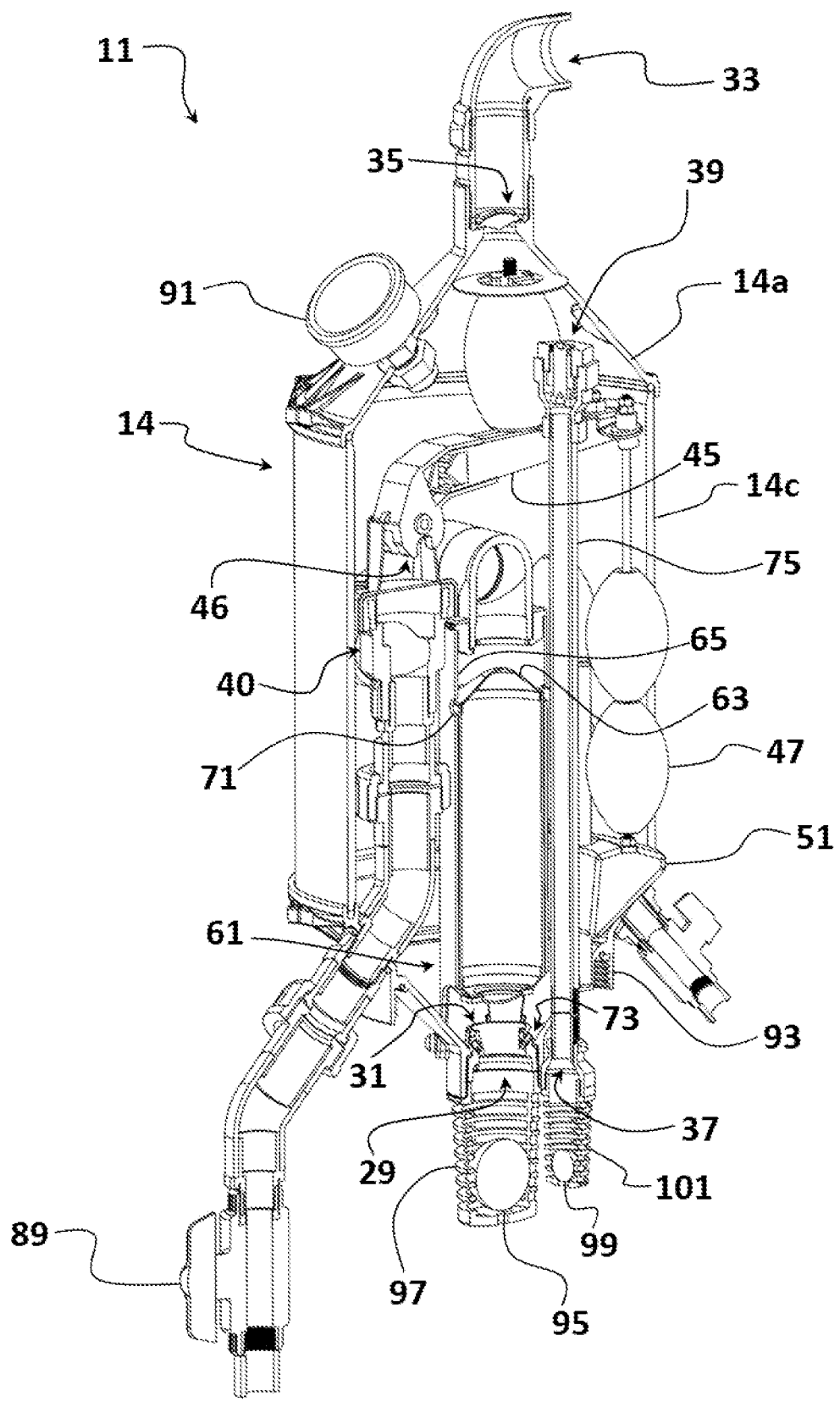

(51) Int. Cl.
*F04F 10/00* (2006.01)
*F16K 31/28* (2006.01)

(58) Field of Classification Search
CPC ......... Y10T 137/2849; Y10T 137/2863; Y10T 137/2883; Y10T 137/2911
See application file for complete search history.

(56) References Cited

U.S. PATENT DOCUMENTS

| | | | | |
|---|---|---|---|---|
| 1,651,945 | A * | 12/1927 | Bolling | F23K 5/02 |
| | | | | 137/131 |
| 2,399,111 | A * | 4/1946 | George, Sr. | F16T 1/305 |
| | | | | 73/322.5 |
| 4,291,836 | A * | 9/1981 | Chen-Hsiung | E03D 5/12 |
| | | | | 137/142 |
| 4,724,860 | A * | 2/1988 | Kelch | F16K 31/20 |
| | | | | 137/433 |
| 5,050,567 | A * | 9/1991 | Suzuki | F02M 37/18 |
| | | | | 123/514 |
| 5,970,999 | A | 10/1999 | Greenia | |
| 8,127,787 | B2 * | 3/2012 | Colton, Sr. | E03C 1/108 |
| | | | | 137/216.2 |

FOREIGN PATENT DOCUMENTS

| | | | |
|---|---|---|---|
| FR | 2372977 | A1 | 6/1978 |
| JP | 2005-344698 | A | 12/2005 |

\* cited by examiner

SIPHON SYSTEMS AND VACUUM PUMPS

This application is a National Stage Application of PCT/NZ2022/050010, filed Jan. 28, 2022, which claims benefit of priority to Application No. 772395, filed Jan. 28, 2021 in New Zealand, and which applications are incorporated herein by reference. To the extent appropriate, a claim of priority is made to each of the above disclosed applications.

FIELD OF THE INVENTION

This invention relates to siphon systems and to vacuum pumps, and in particular, but not exclusively to a vacuum pump that is suitable for priming a siphon system and for maintaining the siphon system in a primed state.

BACKGROUND

A siphon is a very useful way of moving a liquid from one location to another, as a siphon will run naturally without an external power supply. A siphon simply requires that the destination for the liquid is slightly lower than the source, and gravity causes the liquid to flow through the pipe.

For example, a siphon can be used to lift water out of an area of swampy land that is to be drained, and can release the water into a stream, as long as the stream is lower than the water table in the area to be drained. A siphon can be used to lift water up to approximately ten metres, as long as a leak-proof pipe is used, and as long as the upstream end of the pipe remains under the level of the water to be drained.

This ability to lift the water over a reasonable height is significant in that it allows water to be drained from an area, for example a farm paddock, a building site, a storm water collection site, a slip-prone hillside, etc., without having to dig a drainage channel, or to lay in a conventional gravity flow drainage pipe. Gravity flow drainage systems must be carefully constructed to ensure a constant descent throughout the entire length of the system, often making such systems costly to construct. The use of a simple siphon pipe in these situations can result in significant cost savings and significantly reduced environmental impact, as the need to dig or tunnel can be eliminated. The energy savings are also significant, as siphons are able to harness the potential energy that is already present in a body of water, when moving the water to a lower point.

Another advantage of a siphon system in these situations is that a siphon pipe is relatively easy to repair, or clean as the pipe can be situated above ground. By comparison, a deep drainage channel, or an underground drainage pipe can be very expensive to clear or to repair if a blockage occurs. In addition, siphon systems can be easily directed around obstacles, with the ability to direct the path around a building, or under a roadway, etc.

Huge quantities of water that can be moved using a siphon. Where larger volumes are to be moved, a larger diameter pipe is simply used. The flow rate can optionally be increased using booster pumps in some situations. And siphon systems are so efficient that they can continue to operate right until the level of the source water falls to the same level as the siphon outlet.

With conventional subsoil drainage systems, if it is desired to drain to a deeper level into the existing swamp or water table then it is necessary to deepen the entrance to the drain by that amount and also to deepen the entire length of the trench or pipe as well to maintain the required gradient fall. Whereas, with a siphon drain only the intake bore needs to be deepened.

However, there are a number of reasons that siphons are not used as often as one might think possible. The first is that the siphon pipe must first be primed before it will operate—that is, filled with liquid. For small pipes, the pipes can be filled by submerging them in a pool of water to initially fill the pipe with liquid, or a person can suck one end of the pipe until the liquid flows. In larger situations however, it is generally necessary to use a pump to prime the siphon pipe.

And once running, all it takes is a single and momentary 'gulp' of air at the inlet end (or even from the outlet end) to let enough gas into the siphon pipe to stall it. Once the air has reached an apex in the siphon pipe, an air lock can be formed, and the water flowing down the downhill leg of the siphon may be limited by the size of the bubble and may no longer be able to draw the water up the uphill leg.

Another reason is that the liquids being transported in siphon pipes often contain dissolved gases, whether the gases be dissolved air or gases from decay of vegetation, etc. Due to the pressure drop as the liquid rises in the siphon pipe, the dissolved gases begin to expand out of the liquid, forming tiny bubbles of undissolved gases. These tiny bubbles accumulate and form pockets of gases in the high point (or points) of the siphon pipe. This phenomenon occurs in almost all siphon situations, even when the siphon is only required to lift the water or liquid a relatively small height. And in situations where the vertical lift is close to the limit of a siphon system, that is close to ten metres when siphoning water, this problem of gas accumulation becomes very severe. In such cases, even a very small amount of gas from the liquid occupies a significant volume, and forms a large bubble, due to the very low pressure within the upper parts of the siphon pipe.

If gases are allowed to accumulate at the apex, or the highest point along the length piping of a siphon system, the flow through the siphon system is impeded. The pocket of gases that accumulates effectively reduces the cross section of the pipe through which the liquid can flow, having a similar effect to partially closing a valve in the pipework. The pocket of gases can become so large that the flow of liquid stops completely.

The flow rate of liquid through the whole of the siphon system line is reduced by any gas that arises in the lines. Gas arises from minor leakages in the piping structures, dissolved gases coming out of solution, or gulps of air entering from the in-take or out-take if either is exposed to the surrounding air. Mostly the gas bubbles rise and accumulate as a larger bubble at the apex of the system. The liquid and the gases are both being forced to occupy the same limited pipe diameter. They are both being driven by natural forces in opposing directions. They are in an equilibrium together. The accumulated bubble at the apex is an impediment to the flow of water. The water is limited to flowing underneath the bubble and the area and length of the pipe system that is occupied by the bubble.

The head height difference between the upline and the downline of the siphon system still drives flow rate, but that natural flow is restricted by the bubble. In a large head difference situation, the faster liquid flow will cause the bubble to elongate, the elongation being dependent on the slope of the pipe. This increased length of restriction proportionally depresses the potential flow rate. Also, as the volume of the bubble increases it naturally reduces the liquid level on that side of the siphon line. Thus, reducing the head height, and reducing the potential flow rate. Should the bubble become so large that the head height difference is eliminated, all flow will cease.

Also, the head can be reduced further by submerged or entrained bubbles in the water flow. Their air volume in the liquid does not reduce the highest level of the liquid, the apparent head height, but does reduce the actual head by the amount of the gas volume subtracted from the top regions of the column of liquid.

The gases that accumulate at the highest point of a siphon pipe are gases at low pressure, often well below atmospheric pressure, and for this reason a vacuum pump is needed to extract the gases. And since the siphon pipe is filled with gases and liquid, it is usually necessary to use a vacuum pump that will not be damaged if liquid is accidentally drawn into the pump. Many conventional vacuum pumps are not efficient at the low absolute pressures experienced in some siphon systems, and can tend to stall in this application.

U.S. Pat. No. 5,970,999 discussed these very problems and provides a solution of sorts. U.S. Pat. No. 5,970,999 is a system for initially priming a siphon pipe, and for extracting the gases that accumulate in the upper part of the siphon pipe during normal operation, to keep the siphon pipe primed and operating. The system described uses a centrifugal pump, and a separate-volume of liquid, a separate 'priming siphon' and a tuned pairing of liquid inlets that are used to create a cycle of gas extraction and water flow through the pump that allows a centrifugal pump to be used to create the required vacuum for gas extraction from a siphon system.

However, the apparatus described in U.S. Pat. No. 5,970,999 has a number of limitations. Firstly, it requires an electrical or fuel powered pump, which may be difficult or inconvenient to provide in many siphoning applications. It is not common to have an electrical power supply available at many sites where a siphon is to be used.

And secondly, the apparatus described in U.S. Pat. No. 5,970,999 will have a limited ability to create a high degree of vacuum. As with many vacuum pumps, this system would become very inefficient when trying to produce a vacuum having an absolute pressure below a quarter of an atmosphere. In situations where the siphon head is above five metres, the absolute vacuum pressure that is required is below half an atmosphere and can be as low as a tenth of an atmosphere, or even lower.

What is needed is a vacuum pump that is suitable for use in priming a siphon system, a pump that can not only cope with gases and liquids, but a pump that can also operate efficiently down to very low absolute atmospheric pressures, ideally approaching absolute zero atmospheric pressure, to allow siphons to be operate at their maximum head capabilities.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

Object

It is therefore an object of the present invention to provide a system for siphon priming, or a vacuum pump, which will at least go some way towards overcoming one or more of the above-mentioned problems, or at least provide the public with a useful choice.

Statements of the Invention

Accordingly, in a first aspect, the invention may broadly be said to consist in a vacuum pump for removing at least gases from a system, the vacuum pump having;
  a transfer chamber,
  a pressurised liquid inlet configured to allow pressurised liquid to enter the transfer chamber and controlled by a liquid inlet valve,
  a liquid outlet configured to allow liquid to be transferred from the transfer chamber and into the system and the liquid outlet is controlled by a liquid outlet valve,
  a gas outlet configured to allow gases to be expelled from the transfer chamber and controlled by a gas outlet valve, and
  a gas inlet configured to allow gases to enter the transfer chamber from the system and controlled by a gas inlet valve;
the vacuum pump being configured such that the liquid outlet and the gas inlet are in communication with the system from which gases are to be removed.

Preferably the vacuum pump is configured to engage with, and to remove gases from a siphon system.

Optionally the vacuum pump is configured to engage with, and to remove gases from a pumping inlet pipe.

Preferably the transfer chamber is a vessel configured to contain an absolute zero vacuum pressure within the vessel.

Preferably the transfer chamber is a cylindrical vessel or a spherical vessel, or an elliptical vessel.

Preferably the liquid outlet is in the form of a drain port or drain passage that connects a lower region of the transfer chamber with the system.

Preferably the liquid outlet valve is located in a lower region of the transfer chamber.

Preferably the liquid outlet valve is a float operated valve.

Preferably the liquid outlet valve includes a resilient valve member configured to produce a liquid or water tight seal when mated with a valve seat situated in the liquid outlet port or passage.

Preferably the liquid outlet valve is operated by a liquid outlet valve operating mechanism.

Preferably the liquid outlet valve operating mechanism includes at least one outlet valve floatation device.

Preferably the valve member of the liquid outlet valve is operatively connected to the or each outlet valve floatation device.

Preferably the or each outlet valve floatation device is in the form of a piston.

Preferably the liquid outlet valve operating mechanism includes a first guide or guide assembly configured to allow substantially vertical movement of the or each outlet valve floatation device.

Preferably the first guide or guide assembly is in the form of a substantially vertically aligned tube configured to guide the piston.

Preferably the substantially vertically aligned tube of the first guide includes one or more holes or guide outlet passages in an upper part of the tube.

Preferably the substantially vertically aligned tube of the first guide includes one or more holes or lower liquid transfer passages in a lower part of the tube.

Optionally the first guide or guide assembly includes a lever which operates the liquid outlet valve.

Preferably the pressurised liquid inlet is connectable to a pressurised liquid supply, for example a water supply or a water-mains or a water reticulation network.

Preferably the liquid inlet valve is a level sensing valve, for example a float operated valve.

Preferably the liquid inlet valve is located inside the transfer chamber.

Preferably the liquid inlet valve includes a valve control mechanism that is operated by an inlet valve operating mechanism.

Preferably the valve control mechanism is a detented control mechanism.

Preferably the inlet valve operating mechanism has one or more floats that are operatively connected to the valve control mechanism.

Preferably the or each float is operatively connected to the valve control mechanism via one or more levers.

Preferably the inlet valve operating mechanism includes at least one float having a density of less than 0.8 grams per cubic centimetre ($g/cm^3$), and at least one weight or sinker having a density in the range of 1.0 to 2.0 grams per cubic centimetre.

Preferably the inlet valve operating mechanism includes a high-level float situated at or adjacent an upper part of the transfer chamber.

Preferably the inlet valve operating mechanism includes a low-level sinker or weight that is situated at or adjacent a lower part of the transfer chamber.

Preferably the inlet valve operating mechanism includes a primary buoyancy float or float assembly that is situated between the high-level float and the low-level weight.

Preferably the inlet valve operating mechanism includes a single lever arm, and the primary buoyancy float or float assembly is able to act directly on the lever arm Preferably the high-level float and the low-level weight are each connected to the lever arm via a respective connecting rod or rods.

Preferably the inlet valve operating mechanism includes a substantially vertically aligned second guide or guide assembly.

Preferably the pressurised liquid inlet is configured to direct incoming liquid onto an upper surface of the outlet valve floatation device.

Preferably the tube of the first guide includes liquid transfer ports configured to allow the incoming liquid to flow into the remainder of the interior of the transfer chamber.

Preferably the vacuum pump further includes at least one equalisation port or passage configured to allow the pressure in the area adjacent the liquid outlet valve to equalise with the pressure in the system when the liquid inlet valve is closed and immediately before the liquid outlet valve opens.

Preferably the gas inlet includes a riser passage having a lower end and an upper end, the lower end of the riser passage being in communication with the system, and the upper end of the riser passage being located in an upper region of the transfer chamber.

Preferably the gas inlet valve is located at or adjacent the upper end of the riser passage.

Preferably the gas inlet valve is a one-way valve configured to open when pressure within the system exceeds the pressure within the upper region of the transfer chamber.

Preferably the gas inlet valve is a pressure operated valve.

Preferably the gas outlet is in communication with an upper part of the inside of the transfer chamber.

Preferably the gas outlet valve is a one-way valve configured to open when pressure within the transfer chamber exceeds the pressure outside the transfer chamber.

Preferably the gas outlet valve is a pressure operated valve.

Preferably the gas outlet is configured to vents gases to atmosphere.

In a second aspect, the invention may broadly be said to consist in a purging or pumping apparatus having a housing defining a transfer chamber, the transfer chamber having a gas venting means and being connectable to an external pressurized fluid supply, the transfer chamber also being connectable to a pipe or system to be purged or pumped in such a manner that the transfer chamber communicates with a part of the pipe or system to be purged or pumped, and the communication between the transfer chamber and the pipe or system allows gases from the pipe or system to transfer into the transfer chamber at the same time that liquid from within the transfer chamber flows into the pipe or system; the pumping apparatus being configured to repeat a two stage purging or pumping process;
- a first stage in which the communication between the transfer chamber and the pipe or system is temporarily closed and the pressurized fluid supply is used to fill or almost fill the transfer chamber with liquid, thereby pushing all, or a greater part of, any gases within the transfer chamber out of the transfer chamber through the gas venting means, and
- a second stage in which the pressurised fluid supply and the gas venting means are closed, and in which gases from the pipe or system are able to flow into the transfer chamber while the liquid in the transfer chamber flows under the force of gravity into the pipe or system.

Preferably the first and the second stages are controlled by valves configured to permit the required flows of liquids and gases during each stage.

In a third aspect, the invention may broadly be said to consist in a purging or vacuum pumping apparatus having;
- a housing or body capable of holding at least a partial vacuum pressure,
- a liquid inlet controlled by a liquid inlet valve,
- a liquid outlet controlled by a liquid outlet valve,
- a gas inlet controlled by a gas inlet valve, and
- a gas outlet situated in an upper part of the housing and controlled by a gas outlet valve;

the liquid inlet being connectable to a pressurized liquid supply; the liquid outlet and the gas inlet both being connectable to a pipe or system to be purged or pumped by the apparatus; and the apparatus also includes valve control and actuation means configured to;
- open the liquid inlet valve when the liquid level within the housing is or falls below a first predetermined low-level point to allow the housing to be filled with liquid,
- close the liquid inlet valve when the liquid level within the housing rises to a predetermined high-level point,
- open the liquid outlet valve after the liquid inlet valve has closed,
- close the liquid outlet valve when the liquid inlet valve opens,
- open the gas inlet valve when the pressure within the housing is less than the pressure in the pipe or system to be purged or pumped by the apparatus,
- close the gas inlet valve when the pressure within the housing is greater than the pressure in the pipe or system to be purged or pumped by the apparatus,
- open the gas outlet valve when the pressure within the housing exceeds the pressure in the area outside the housing and in communication with the gas outlet, and
- close the gas outlet valve when the pressure within the housing is less than the pressure in the area outside the housing that is in communication with the gas outlet.

Preferably the liquid inlet valve is not closed until the liquid level within the housing rises to a point where substantially all free gases have exited the housing.

Preferably the gas outlet is open to atmosphere when the gas outlet valve is open.

Preferably the control and actuation of the gas inlet valve and the gas outlet valve is achieved using simple check valves configured to allow gas flow in the desired direction only.

Preferably the gas inlet valve and/or the gas outlet valve are pressure operated valves.

Preferably the liquid inlet valve and/or the liquid outlet valve are float operated valves.

In a fourth aspect, the invention may broadly be said to consist in a siphon system incorporating at least one vacuum pump substantially as specified herein.

Preferably the siphon system includes a settling or separation chamber which is situated at a high point of the siphon system.

Preferably the settling chamber includes a section of pipe having a larger diameter than the remainder of the pipework of the siphon system.

Preferably the settling chamber includes a riser section configured to collect gases and to communicate with the vacuum pump.

In a fifth aspect, the invention may broadly be said to consist in a de-aeration apparatus incorporating at least one vacuum pump substantially as specified herein.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

DESCRIPTION

Figure 2:
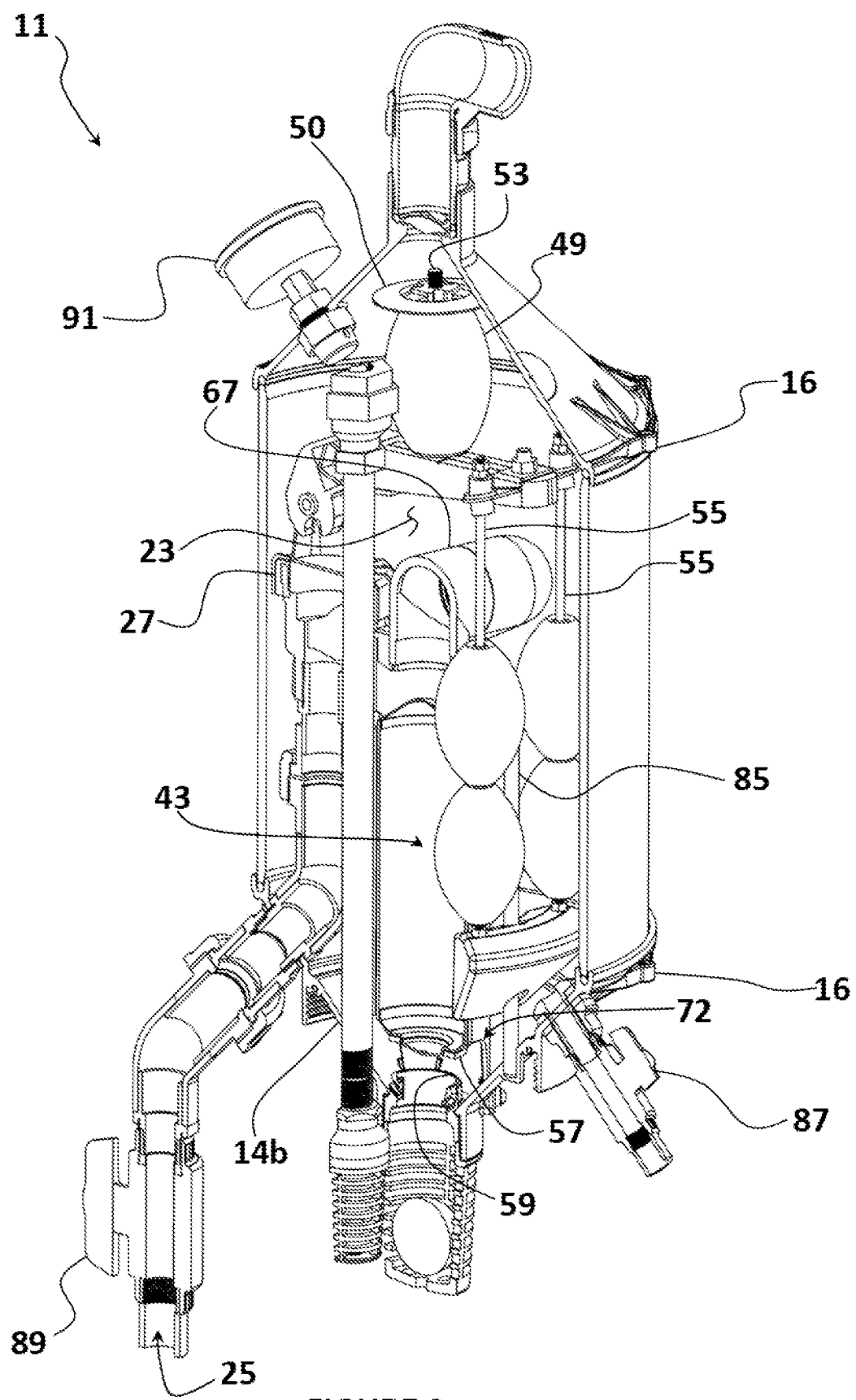
Figure 3:
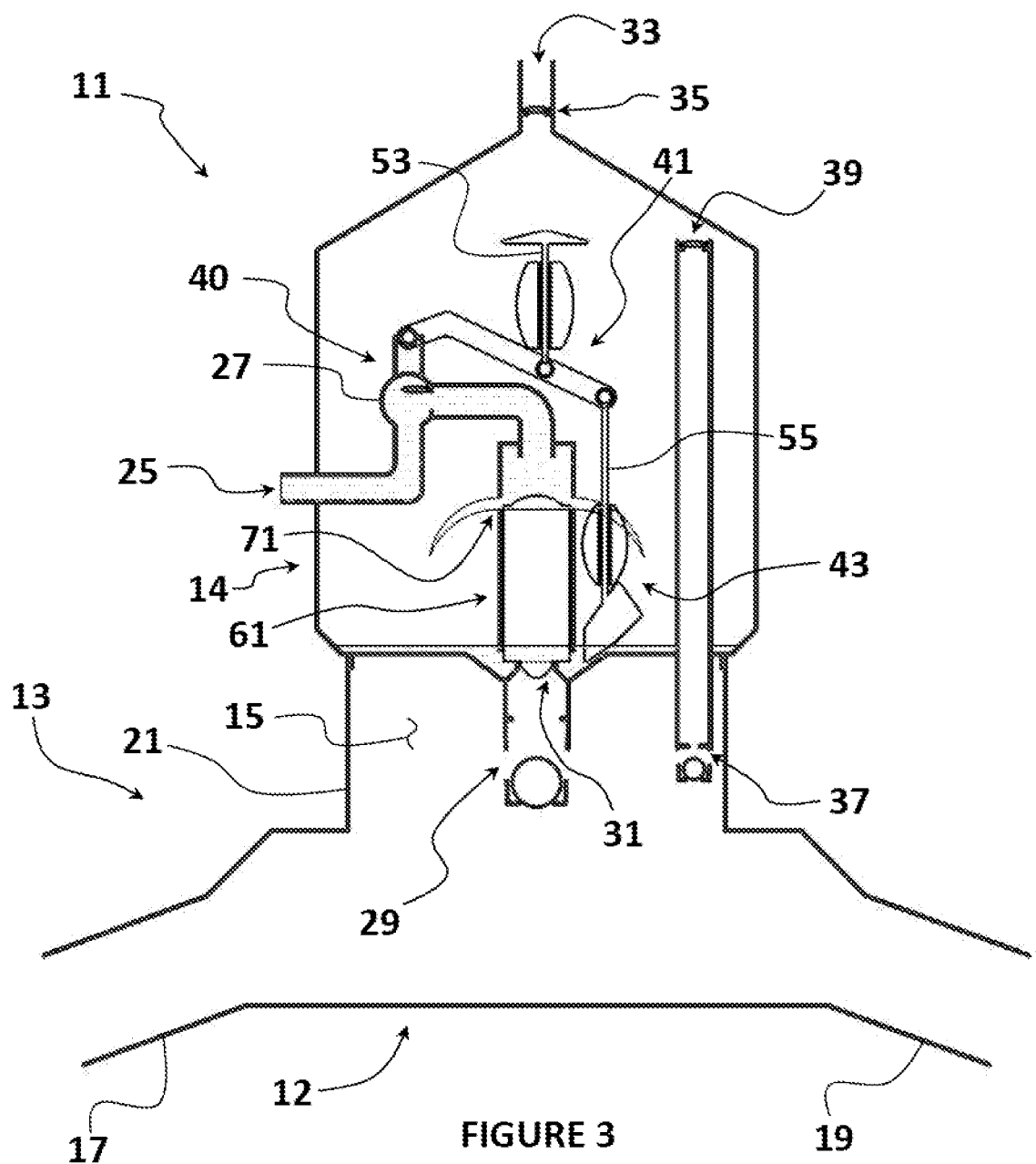
Figure 4:
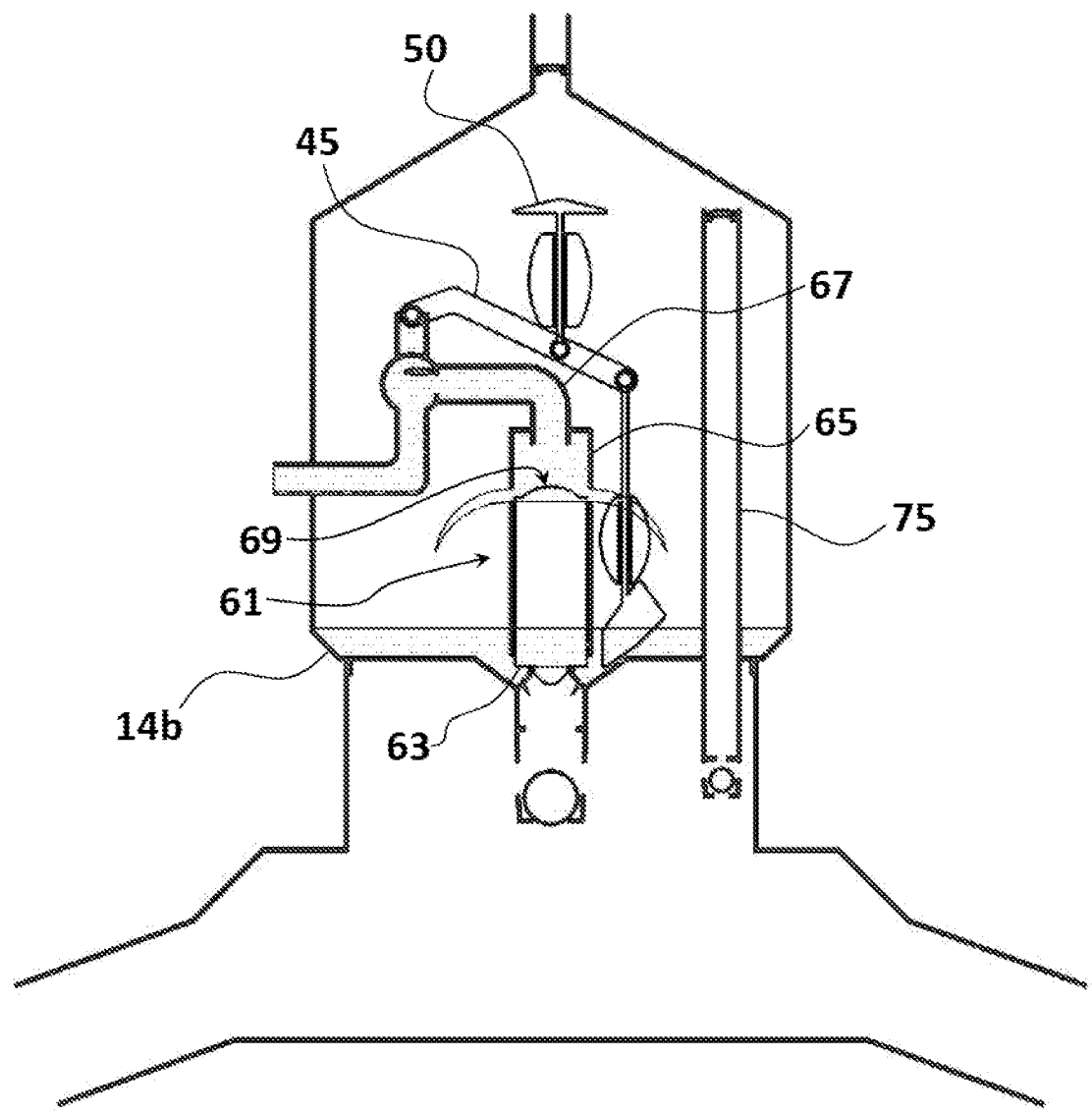
Figure 5:
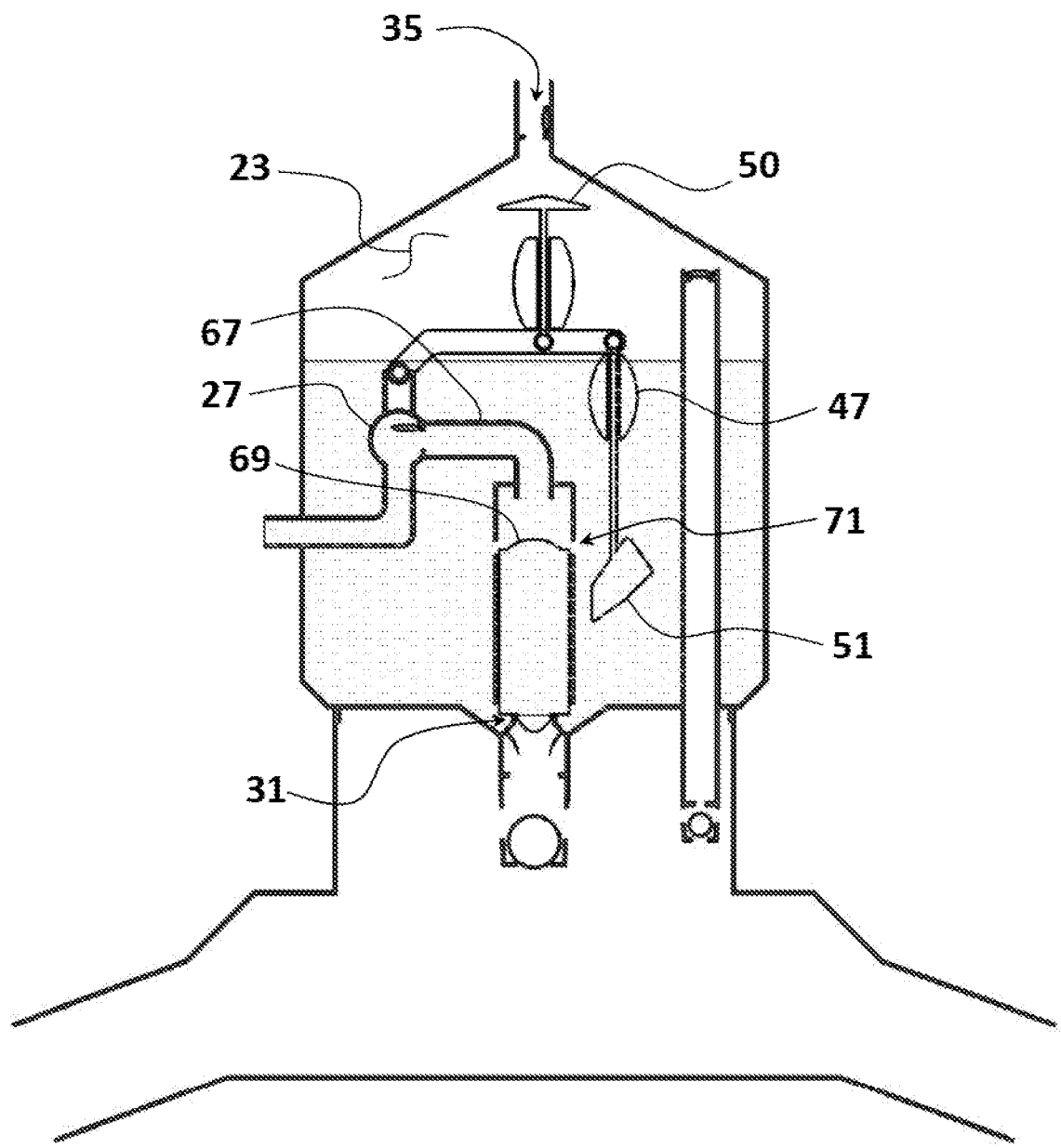
Figure 6:
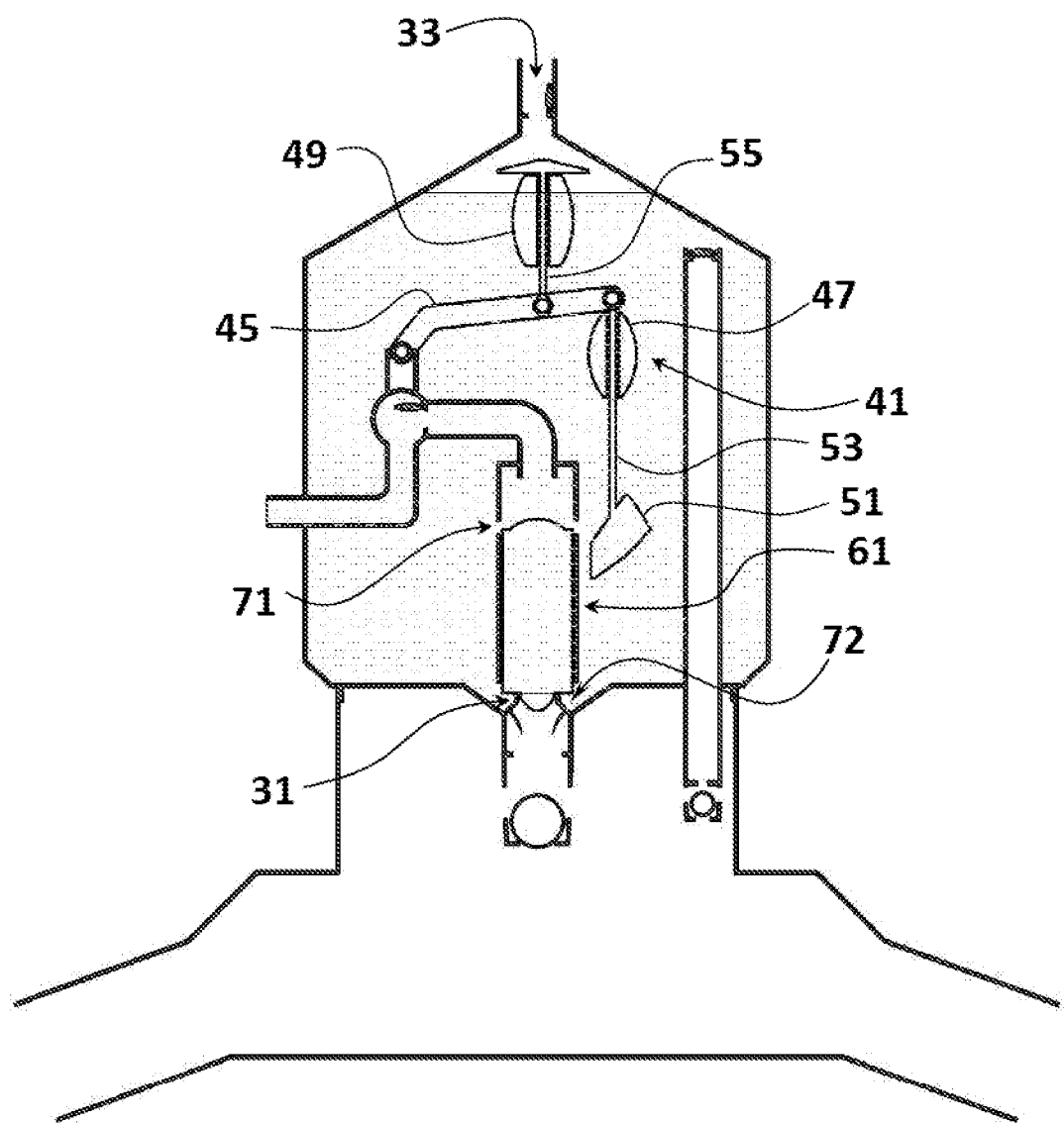
Figure 7:
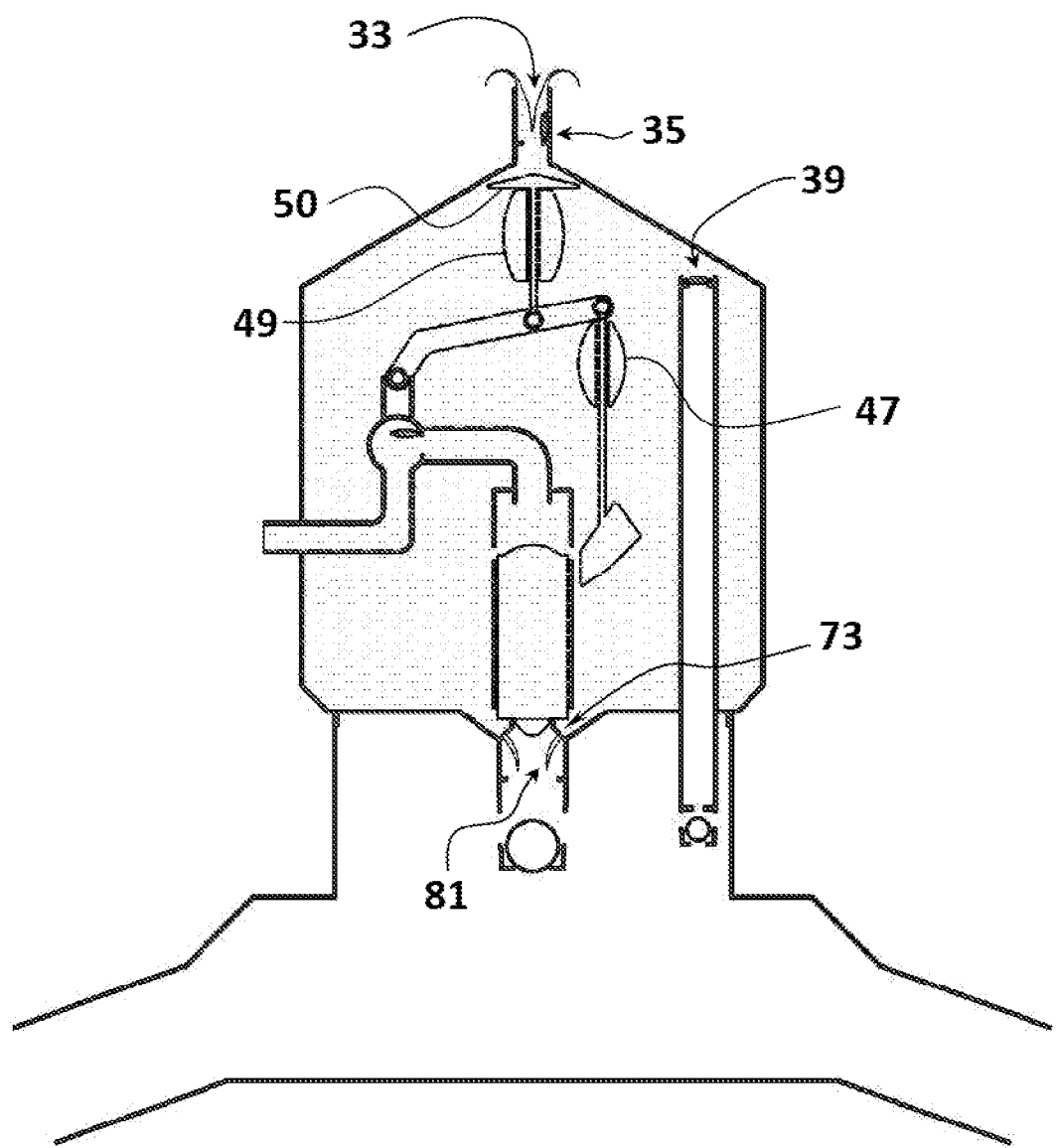
Figure 8:
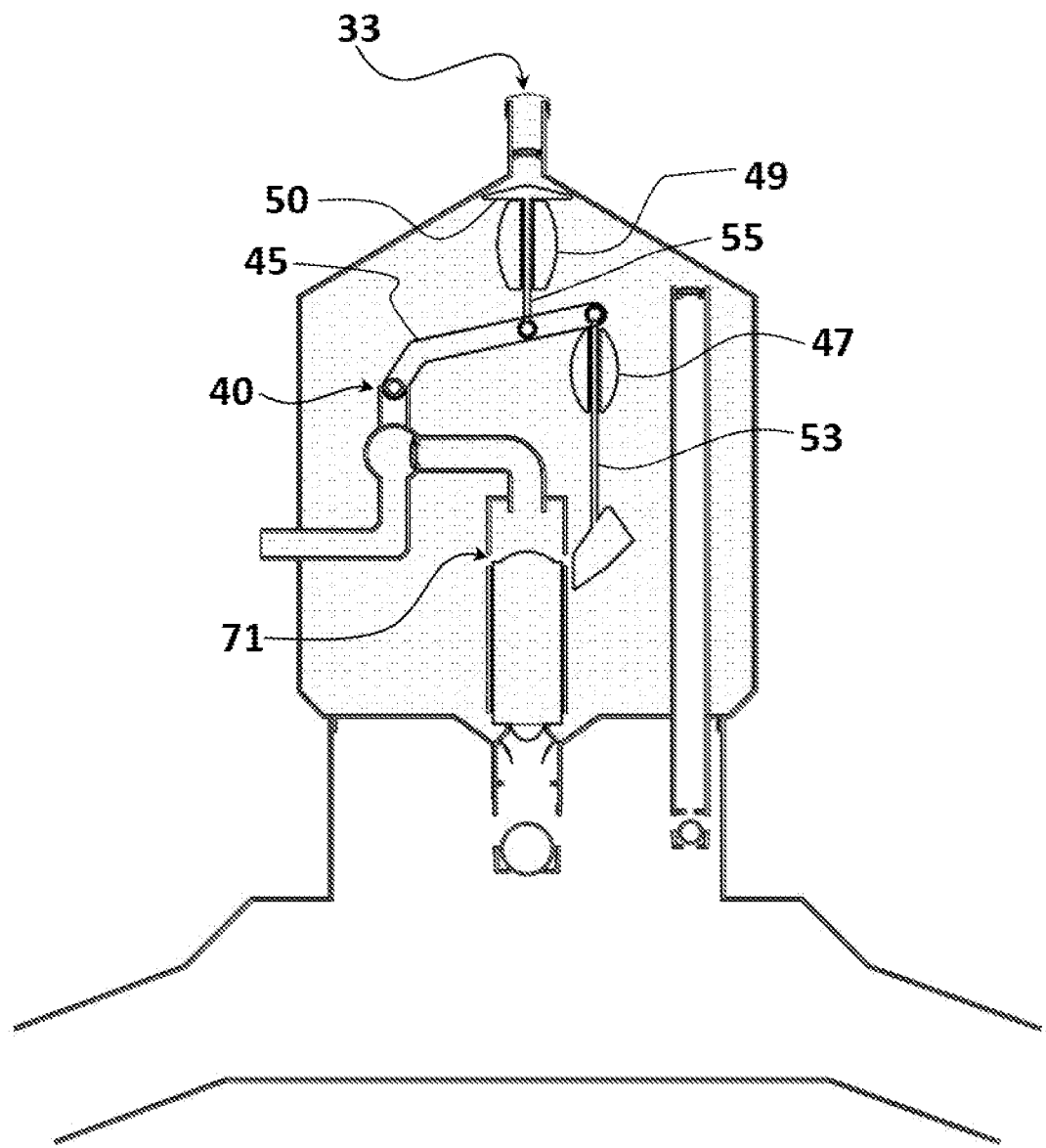
Figure 9:
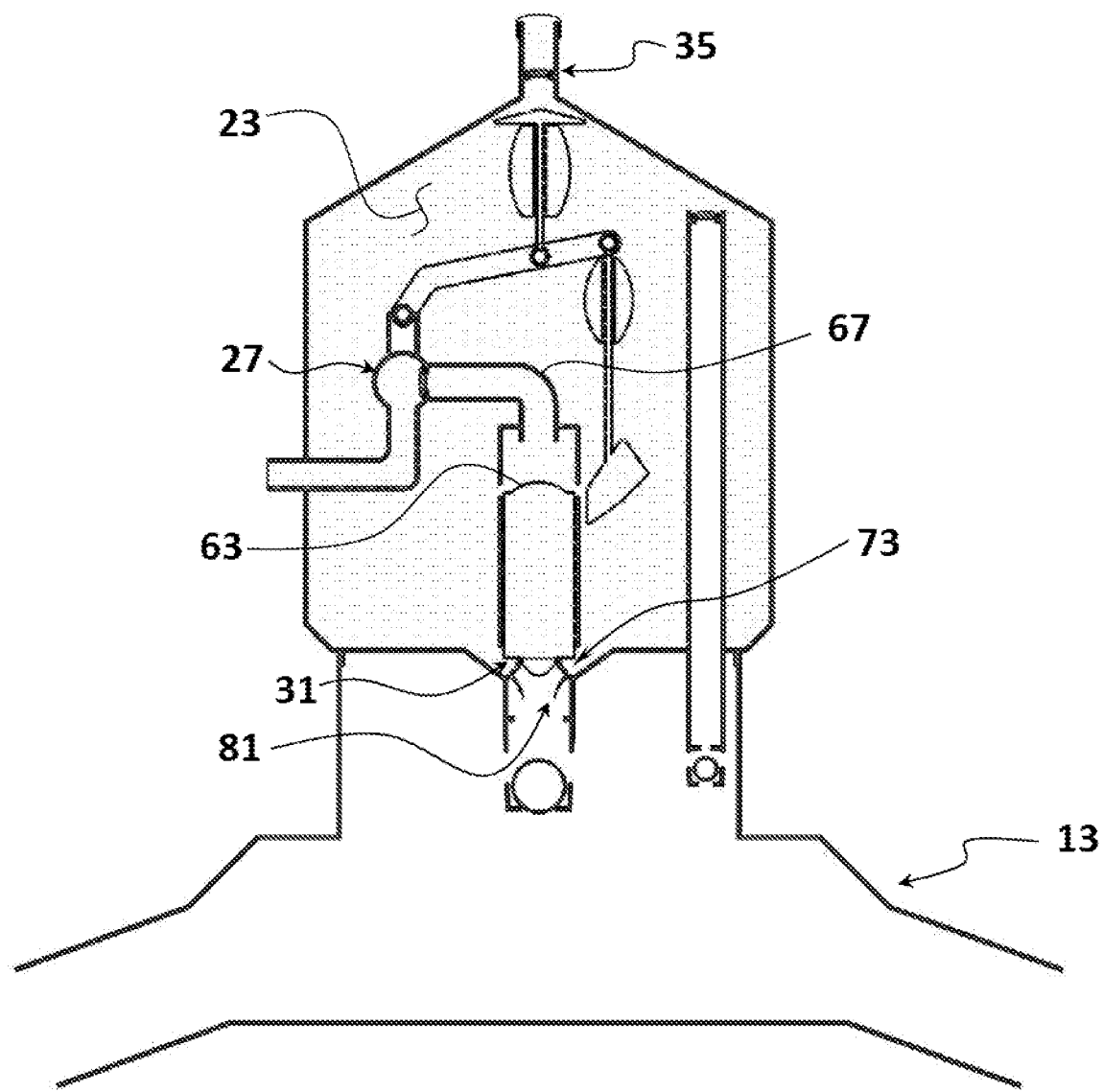
Figure 10:
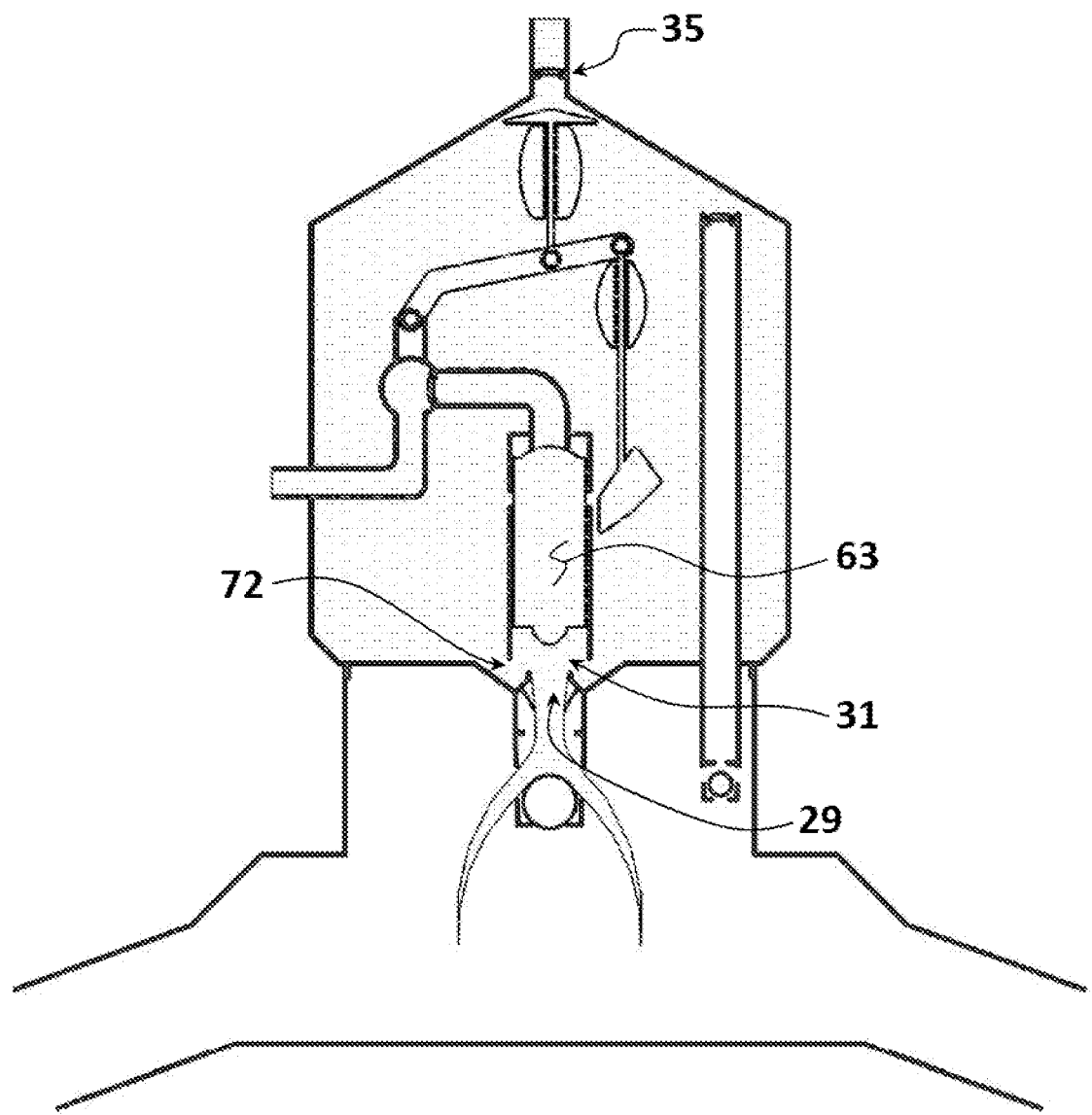
Figure 11:
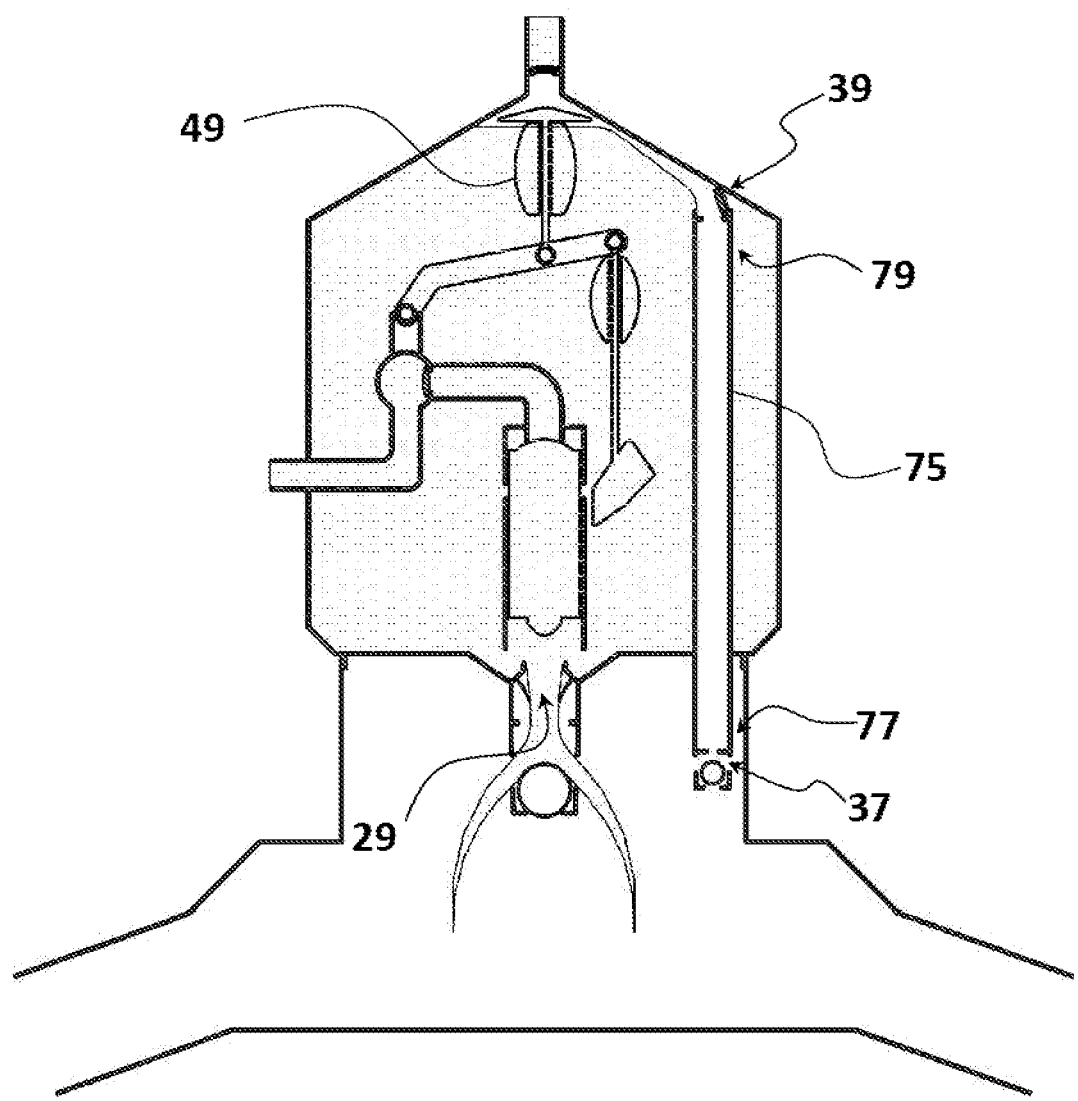
Figure 12:
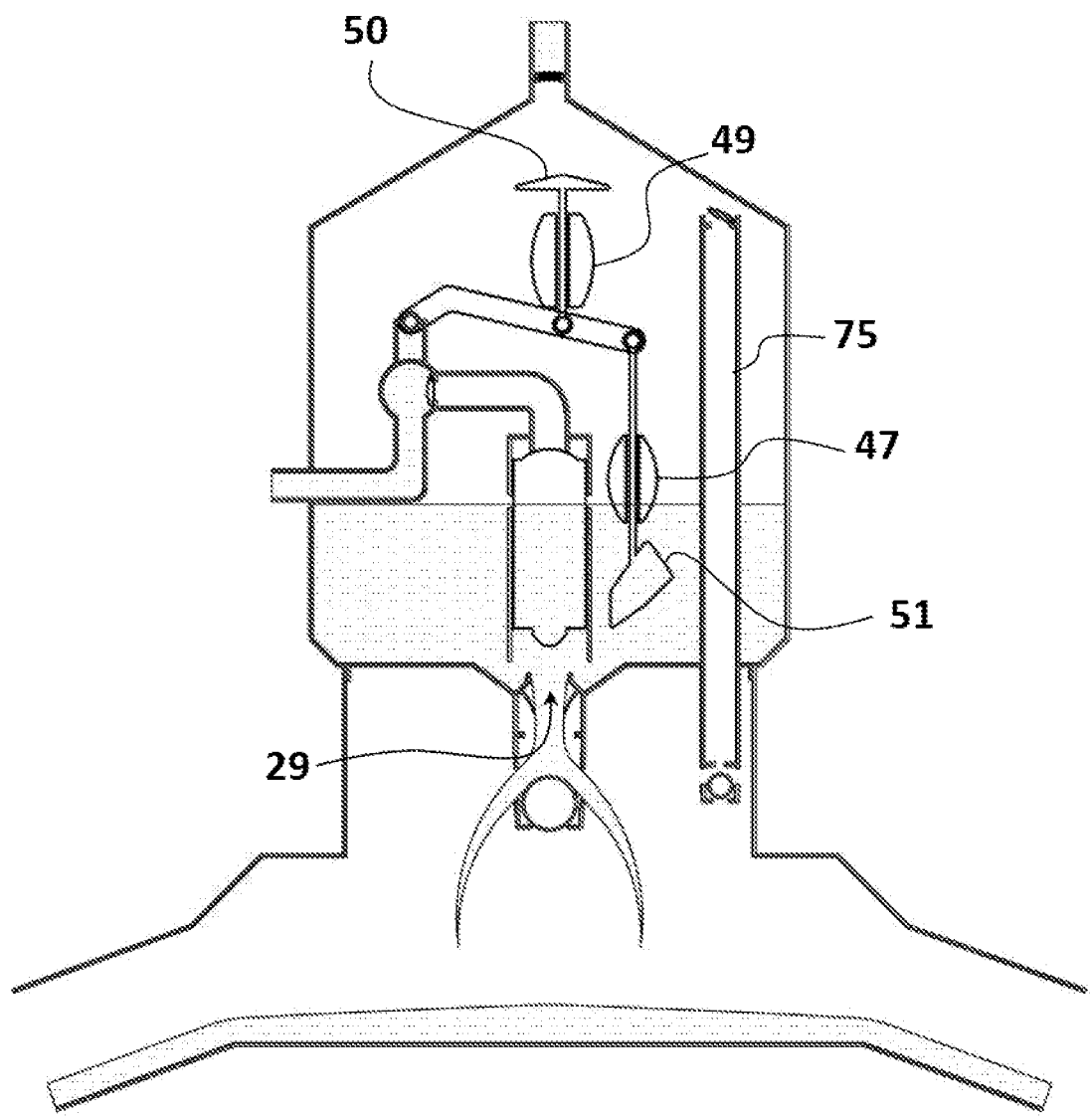
Figure 13:
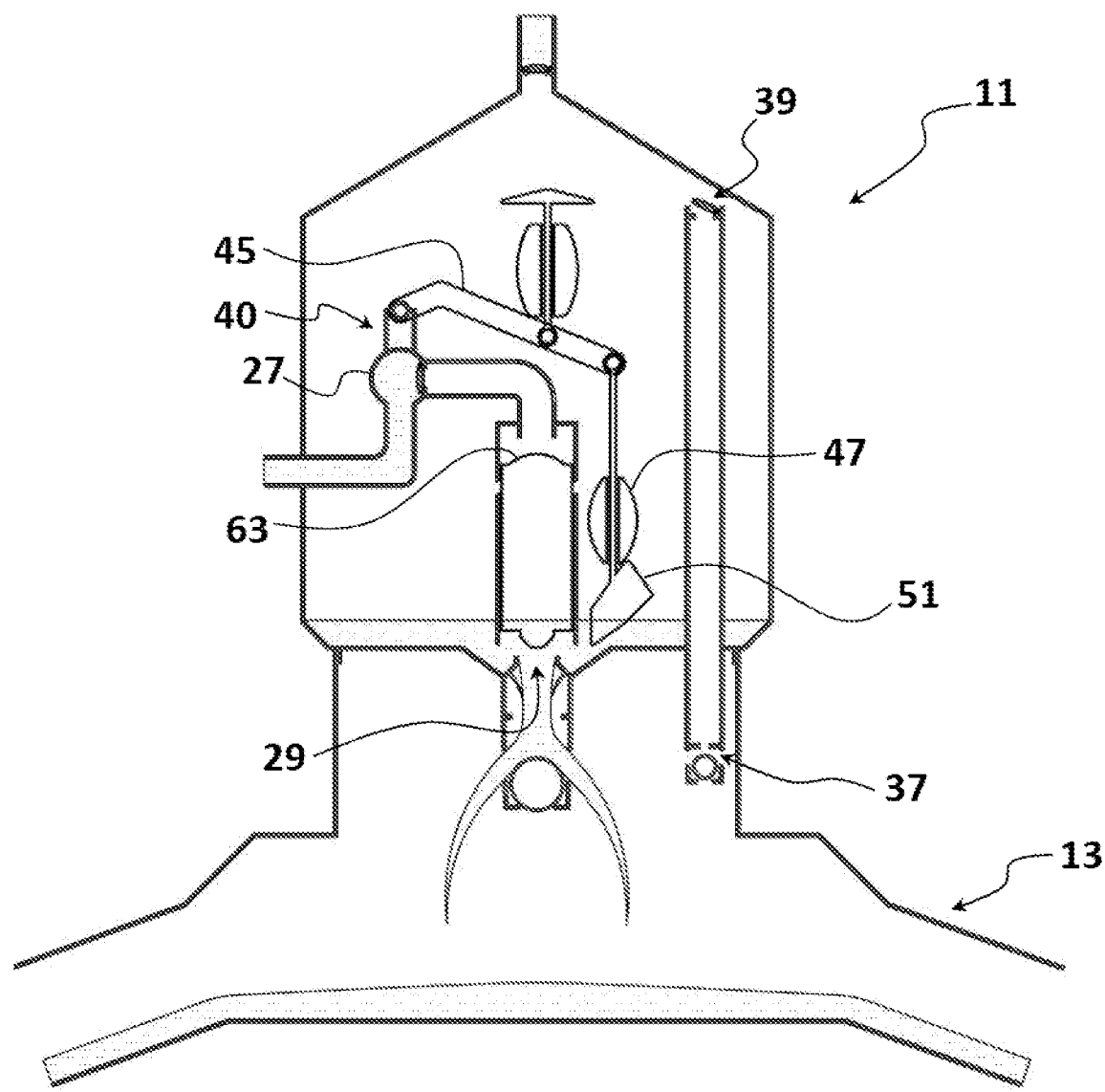
Figure 14:
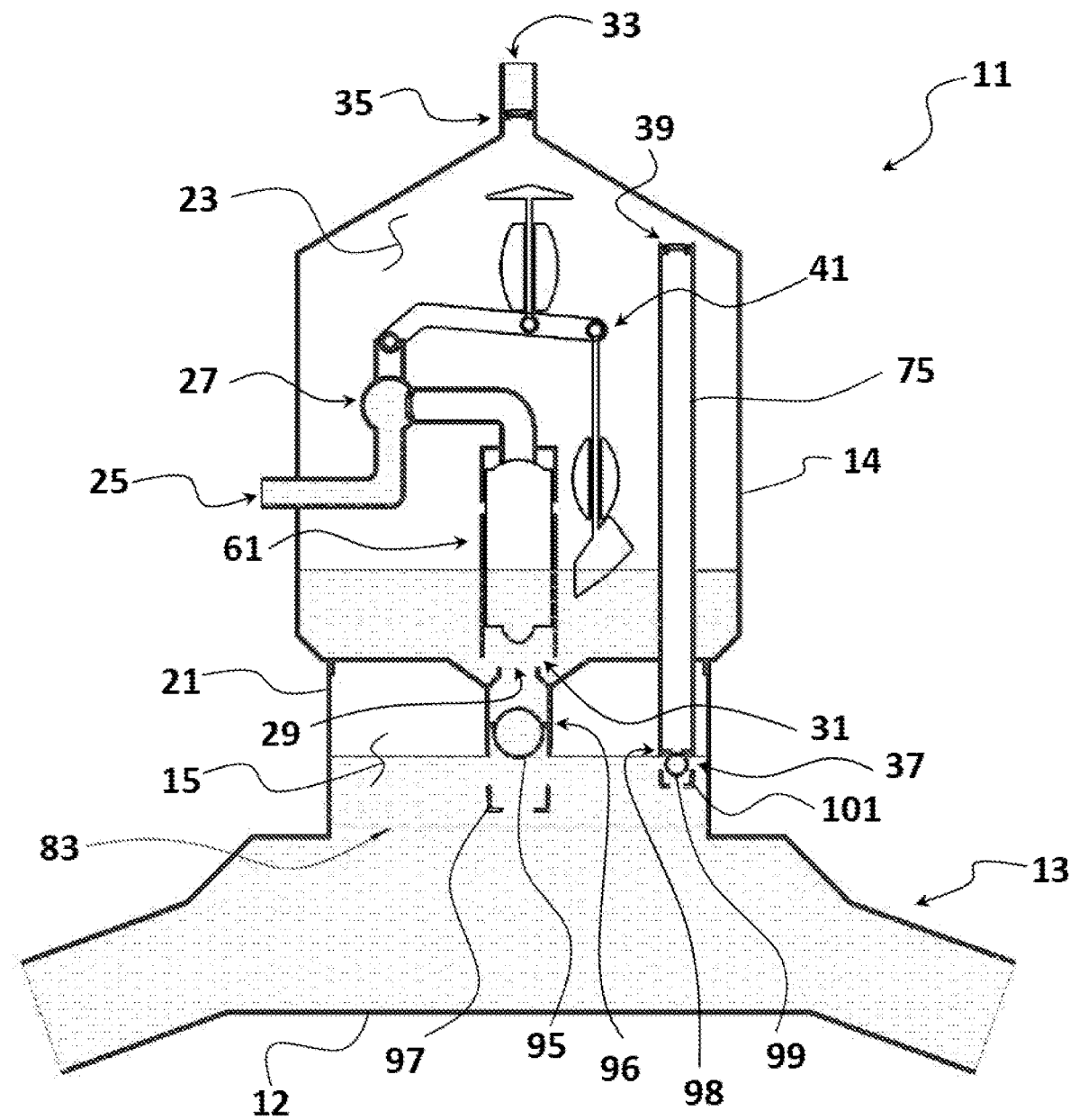

Further aspects of the present invention will become apparent from the following description which is given by way of example only and with reference to the accompanying drawings in which:

FIG. 1 is a first cutaway perspective view of a vacuum pump according to the present invention, FIG. 2 is a second cutaway perspective view of the vacuum pump, FIG. 3 is a schematic diagram showing the configuration of the internal parts of the vacuum pump when a liquid inlet valve is initially opened, FIG. 4 is a schematic diagram showing the configuration of the internal parts of the vacuum pump during an early liquid filling phase and before a gas outlet valve has opened, FIG. 5 is a schematic diagram showing the configuration of the internal parts of the vacuum pump when the liquid filling phase is nearing completion and after the gas outlet valve has opened, FIG. 6 is a schematic diagram showing a transfer chamber of the vacuum pump almost full of liquid and a high-level trip being float raised by the rising liquid level, FIG. 7 is a schematic diagram showing the configuration of the internal parts of the vacuum pump nearing the end of the liquid filling phase with a trip umbrella device moving upward to begin closing the liquid inlet valve, FIG. 8 is a schematic diagram showing the configuration of the internal parts of the vacuum pump when the liquid inlet valve, and the gas outlet valve, are closed at the end of the liquid filling phase, FIG. 9 is a schematic diagram showing the configuration of the internal parts of the vacuum pump during a pressure equalisation phase, FIG. 10 is a schematic diagram showing the configuration of the internal parts of the vacuum pump when a liquid outlet valve is opened, FIG. 11 is a schematic diagram showing the configuration of the internal parts of the vacuum pump during a transfer phase when a gas transfer valve opens allowing gases to enter the housing while a transfer of liquid out of the housing continues, FIG. 12 is a schematic diagram showing the configuration of the internal parts of the vacuum pump during the transfer phase and when the high-level trip float is no longer submerged and has descended, FIG. 13 is a schematic diagram showing the configuration of the internal parts of the vacuum pump during a later stage of the transfer phase, while the primary buoyancy float is descending, and before the liquid inlet valve is opened again, and FIG. 14 is a schematic diagram showing the configuration of the internal parts of the vacuum pump during an idling phase.

With reference to FIGS. 1 to 14, a vacuum pump (11) according to the present invention will now be described. The vacuum pump (11) has been designed primarily for use in priming, or maintaining prime in a siphon pipe or siphon system, or in an inlet pipe of a pumping system. It is envisaged that the vacuum pump (11) can also be used as a de-aeration apparatus to purge or remove air or other gases from liquids in a range of applications. Or maintain the vacuum within a vacuum chamber FIGS. 1 and 2 show a practical example of the vacuum pump (11), and FIGS. 3 to 14 show the vacuum pump (11) in a series of schematic views to help explain its operation. In FIGS. 2 to 11 the vacuum pump (11) is shown fitted to a part of a siphon system (13).

With reference to FIGS. 1 and 2, it can be seen that the vacuum pump (11) includes a housing (14), a liquid inlet (25), a liquid inlet valve (27), a drain port or liquid outlet (29), and a liquid outlet valve (31). The vacuum pump (11) also includes a gas inlet (37), a gas inlet valve (39), a gas outlet (33), and a gas outlet valve (35).

To control the operation of the liquid inlet valve (27), the vacuum pump (11) includes a first floatation device (43). In this example, the first floatation device (43) includes a lever arm (45) and a number of floats and weights that will be explained in further detail below. And to control the operation of the liquid outlet valve (31) the vacuum pump (11) includes a second floatation device or liquid outlet valve operating mechanism (61).

In basic terms, the vacuum pump (11) operates by first filling the housing (14) with a pressurised water supply while the inside of the housing (14) is open to atmosphere and is closed to the siphon system (13). And when the filling is complete, the inside of the housing is then opened to the siphon system while at the same time it is closed to atmosphere. And during this time, gases from the siphon system (13) ascends into the housing (14) while water descends from the housing (14) and into the siphon system (13). Once this transfer is complete, the housing (14) is again closed to the siphon system (13) and is opened to atmosphere, and the cycle repeats.

In slightly more specific terms, this basic operation of the vacuum pump (11) can be described as follows. A liquid, typically water, is supplied under pressure to fill the housing (14) via the liquid inlet valve (27). In this way all gas is removed from the housing (14) via the gas outlet valve (35). Then the liquid inlet valve (27) is closed and the liquid outlet valve (31) is opened, and the water is released from the housing and into the siphon system (13), while at the same time, gas that has accumulated at an apex of the siphon system (13) is able to transfer into the housing (14) via the gas inlet valve (39).

When this transfer of water and gas is completed, the liquid outlet valve (31) is closed, and the liquid inlet valve (27) is opened, allowing water to flow into the housing, again purging the gases out through the gas outlet valve (35). This process is repeated until a state of equilibrium is reached, when no more gases can be extracted from the siphon system (13), and the vacuum pump (11) sits idle until more gases accumulate in the siphon system (13).

With reference to FIGS. 3 to 14 the operation of the vacuum pump (11) will now be described in greater detail. To facilitate efficient operation of the vacuum pump (11), the siphon system (13) ideally includes a settling chamber (15), or an accumulation bell area, which is situated at an apex or high point of the siphon system (13). The vacuum pump (11) is essentially joined to a 'T' shaped fitting (12) at the apex of the siphon system (13). The join must be carefully sealed as the pressure in the apex of the siphon system (13) can approach an absolute vacuum. The settling chamber or bell (15) is essentially the leg of the upside down 'T' shaped fitting (12).

The horizontal section of the upside down 'T' shaped fitting (12) provides a short section of pipe having a larger diameter than the remainder of the pipework of the siphon system (13). It is considered advantageous if the diameter of an 'uphill' section (17) of the pipework is smaller than the diameter of a 'downhill' section (19) of the pipework. Also, it is considered advantageous if the 'uphill' section (17) of the pipework has a lower gradient than the 'downhill' section (19) of the pipework. Such a configuration helps with the collection and removal of any gases that form in the liquid. The gases will tend to be carried along and upwards relatively easily in the 'uphill' section (17), but the bubbles of gas have to fight against the current in the 'downhill' section (19) as they travel against the flow toward the settling chamber (15).

The greater diameter, or cross-sectional area of the settling chamber (15) helps to slow down the flow rate and allows the bubbles of air time to combine and rise, and to be collected within a riser section (21) of the settling chamber (15). The riser section (21) is configured to collect gases and to communicate with the vacuum pump (11).

It is important that the uphill sections of pipe (17) and the downhill sections of pipe (19) have no additional apexes. Gases will accumulate at any apex in the pipes and will need another vacuum pump (11), or a connection to the riser section (21), to remove the gases.

The housing (14) is in the form of a vertically aligned cylinder having a conical top end (14a), a conical bottom end (14b), and a substantially parallel side cylindrical mid-section (14c). (The conical bottom end (14b) is shown as a stepped configuration in FIGS. 3 to 14 for diagrammatic purposes only, and the actual conical shape is shown in FIGS. 1 and 2.) Reinforced lugs (16) that extend radially from the perimeter of the conical top end (14a) and of the conical bottom end (14b) are provided, and these allow the two ends of the housing to be assembled to the cylindrical mid-section (14c), and to be held in place, using a series of threaded rods or long bolts about the circumference of the cylindrical mid-section (14c), that span from the lugs (16) of the conical top end (14a) to the lugs (16) of the conical bottom end (14b). Seals are positioned at each end of the cylindrical mid-section (14c) to effect a fluid tight seal where the conical top end (14a) and the conical bottom end (14b) join to the cylindrical mid-section (14c).

The housing or body (14) forms a sealed transfer chamber (23) that is configured to engage with, and to communicate with, the siphon system (13). The transfer chamber (23) could similarly be configured to engage and communicate with the inlet pipe of a pumping system or some other system which is to be de-aerated. The engagement and communication is configured to allow gases to be removed from the siphon system (13), inlet pipe or other system.

The transfer chamber (23) is a vessel configured to contain vacuum pressures and is ideally capable of holding an absolute zero vacuum pressure. As noted above, in this example, the transfer chamber (23) is a cylindrical shaped housing or vessel (14) having conical, or at least part conical, shaped ends. However, it is envisaged that in an alternative configuration, the transfer chamber (23) could be in the form of a spherical vessel, or a cylinder having semi-spherical ends, or an elliptical shaped vessel, or some similar shaped vessel. Such shapes are suited to withstanding vacuum pressures.

With reference to FIGS. 3 and 4, the location of some of the key features noted above will now be identified in the simplified schematic diagrams. At the left of the diagram, the pressurised liquid inlet (25) can be seen, and this allows pressurised liquid to enter the transfer chamber (23). The flow through the liquid inlet (25) is controlled by the liquid inlet valve (27) which in this example is situated within the housing (14). In the lower part of the housing (14), the liquid outlet (29) is shown, and this is configured to allow liquid to be transferred from the transfer chamber (23) and into the riser section (21) of the siphon system (13). Flow through the liquid outlet (29) is controlled by the liquid outlet valve (31) situated immediately above the liquid outlet (29).

At the top of the vacuum pump (11) the gas outlet (33) can be seen. The gas outlet (33) allows gases to be expelled from the transfer chamber (23), and the flow of gases through the gas outlet (33) is controlled by the gas outlet valve (35) which in this example is in the form of a one-way valve or a flapper valve situated in a tube that forms the gas outlet (33). Adjacent to the lower right portion of the housing (14), the gas inlet (37) can be seen. The gas inlet (37) is configured to allow gases to enter the transfer chamber (23), and the flow of gases from the riser section (21) and into the transfer chamber (23) is controlled by the gas inlet valve (39).

The gas inlet valve (39) is a one-way valve in the form of a flapper or poppet valve, and is situated at an upper end (79) of a riser passage or snorkel tube (75). A lower end (77) of the snorkel tube (75) contains a gas inlet (37) that allows gases within the settling chamber (15) to enter the riser passage or snorkel tube (75). It is advantageous for the upper end (79) of the snorkel tube (75) to be situated as high as possible within the transfer chamber (23), as this reduces the water pressure on the top side of the flapper of the gas inlet valve (39) and makes it easier for the gas inlet valve (39) to open when it is time for gases from the siphon system (13) to enter the transfer chamber (23) via the snorkel tube (75).

In these schematic diagrams, it can be seen that the vacuum pump (11) is configured in such a manner that both the liquid outlet (29) and the gas inlet (37) communicate with the siphon system (13), or another system, from which gases or air are to be removed.

The liquid inlet (25) is connectable to a pressurised liquid supply, for example a local water supply or a water-mains or a farm trough water reticulation network. It is envisaged that while an electrical supply is not often available in situations where a siphon system is to be used, a pressurised water supply may be nearby, or could be established. A gravity fed, or a manually filled, reservoir or tank could for example be positioned on a hillside, or hung from a tree to provide a local gravity fed system if no other pressurised water supply was available.

The pressure supplied to the liquid inlet (25) need only be a little greater than atmospheric pressure, as this is sufficient pressure to push gas or air out of the transfer chamber (23) and out into the surrounding atmosphere. Having said this, in the example shown and described herein, the water supply pressure is also used to push a piston (63) of the second floatation device (61) downwards, and to hold the piston (63) down, during the process of filling the transfer chamber (23) with liquid. The inventor has found that a water supply having a gauge pressure in the region of 150 to 500 kilopascals (KPa), or 20 to 80 pounds per square inch (psi), is desirable for efficient operation of the vacuum pump (11).

The liquid inlet valve (27) is operated in response to liquid level changes within the transfer chamber (23), and in this example is a float operated valve having a detented valve control mechanism (40). An example of a suitable valve having a detented valve control mechanism (40) is the 'Hansen Leveller Water Tank Valve' which is a diaphragm operated valve. Other types of valve that provide a similar 'snap' or 'trigger' action, when going from 'on-to-off', or from 'off-to-on', could be used. The use of a detented diaphragm operated valve is advantageous in that it provides full flow during the entire filling phase, and includes a soft close when shutting off the flow when the transfer chamber (23) is full of water.

The detented valve control mechanism (40) of the liquid inlet valve (25) is operated by a liquid inlet valve operating mechanism (41). The valve control mechanism (40) is operatively connected to a number of floats of the liquid inlet valve operating mechanism (41). In this example, the liquid inlet valve operating mechanism (41) includes a lever arm (45) which is acted on by a first floatation device (43). The lever arm (45) moves through a range of approximately twenty-five degrees. The first floatation device (43) comprises a primary buoyancy float (47), and the action of the primary buoyancy float (47) is assisted by a high-level trip float (49) and a low-level trip weight or sinker (51).

The high-level trip float (49) is situated in an upper part of the transfer chamber (23) and is slidably mounted on a first connecting rod (53). The first connecting rod (53) connects a rapid flow trip umbrella (50) to the lever arm (45) at a location that is about half of the way along a length of the lever arm (45) away from a pivot end (46) of the lever arm (45). The rapid flow trip umbrella (50) acts as a vane in that a flow of liquid past the rapid flow trip umbrella (50), during the final stages of the filling of the transfer chamber (23) with liquid, produces an upward force on the first connecting rod (53) that lifts the lever arm (45) to overcome a detent in the detented valve control mechanism (40).

The rapid flow trip umbrella (50) is connected to an upper end of the first connecting rod (53) by a threaded joint. This allows the height of the rapid flow trip umbrella (50), relative to the lever arm (45), to be finely adjusted to allow the timing of the tripping of the detented liquid inlet valve (27) to be optimised. The rapid flow trip umbrella (50) can be accessed through the gas outlet (33), allowing this adjustment to be made with the housing (14) assembled.

The rapid flow trip umbrella (50) is in the form of a shallow angled cone, and is situated immediately below the gas outlet (33). The central part of the substantially circular rapid flow trip umbrella (50) includes flow passages which allow liquid to flow from the transfer chamber and out the gas outlet valve (35). The high-level trip float (49) is a plastic float having a density that is less than the density of water, ideally a density in the region of 0.5 and 0.85 grams per cubic centimetre (g/cm$^3$). Experimentation by the inventor has found that a high-level trip float (49) having a density in the range of 0.75 to 0.8 grams per cubic centimetre works well.

The low-level trip weight (51) is situated in a lower part of the transfer chamber (23) adjacent to the liquid outlet (29). The low-level trip weight (51) can be a resin filled plastic weight having a density in the range of 1.0 to 2.0 grams per cubic centimetre, the density being similar to, or greater than, that of water. Experimentation by the inventor has found that a low-level trip weight (51) having a density in the range of 1.05 to 1.2 grams per cubic centimetre works well.

The primary buoyancy float (47) is a sliding float that is situated between the high-level trip float (49) and the low-level trip weight (51). The primary buoyancy float (47) is mounted in such a way that it can slide vertically up and down on a second connecting rod (55) that connects the low-level trip weight (51) to a free end of the lever arm (45). The primary buoyancy float (47) provides buoyancy to assist in raising the lever arm (45) when the primary buoyancy float (47) is immersed in water.

Note: with reference to FIGS. 1 and 2, it can be seen that in practice the primary buoyancy float (47) is made up of four individual floats, and they are mounted in pairs on two parallel second connecting rods (55). The two parallel second connecting rods (55) are each pivotally connected at an upper end to the lever arm (45) and are connected at a lower end to the low-level trip weight (51). The pivoting connection of the two parallel second connecting rods (55) to the lever arm (45) is also a sliding connection, allowing the lever arm (45) to continue to rotate downwards a small amount (two or three degrees) even after the low-level trip weight (51) has contacted the bottom of the housing (14b).

The primary buoyancy floats (47) are plastic floats having a density that is less than the density of water, ideally a density in the region of 0.25 and 0.5 grams per cubic centimetre (g/cm$^3$). Experimentation by the inventor has found that primary buoyancy floats (47) having a density in the range of 0.3 to 0.35 grams per cubic centimetre work well.

The first connecting rod (53) is connected at its lower end to the lever arm (45), and supports the rapid flow trip umbrella (50) at its upper end. The connection at the lower end of the first connecting rod (53) can optionally be a pivoting connection, with the connection being configured to limit the range of a pivoting motion to keep the rapid flow trip umbrella (50) generally within the upper part of the transfer chamber (23) at all times.

The second connecting rod (55) supports the low-level trip weight (51) in a pendulum type arrangement, being pivotally connected at its upper end to the free end of the lever arm (45). It can be seen in the figures that the low-level trip weight (51) has a somewhat wedge-shaped profile, particularly the lower part of the low-level trip weight (51). This wedge shape is configured to fit into a lower and central part of the stepped conical bottom end (14b), meaning that the low-level trip weight (51) is not fully above the liquid level in the transfer chamber (23) until almost all of the liquid has exited the transfer chamber (23).

As noted above, the liquid inlet valve (27) includes a detented valve control mechanism (40). The inlet valve operating mechanism (41) is configured such that the primary buoyancy float assembly (47) does not exert quite enough force, when either completely submerged, or completely out of the water, to overcome the detent arrangement of the valve control mechanism (40). Instead, the inlet valve operating mechanism (41) relies on the additional buoyancy from the high-level trip float (49) when the transfer chamber (23) is full of water, or the weight from the low-level trip weight when the transfer chamber (23) is drained of water, to overcome the detent and to open or close the liquid inlet valve (27).

In this way, the liquid inlet valve (27) is prevented from opening until a desired low liquid level point is reached, and is prevented from closing until a desired high liquid level is reached. This allows a significant volume of the transfer chamber (23) to be filled with low pressure gases from the siphon system (13) before the liquid inlet valve (27) opens to purge the gases from the transfer chamber (23). This also allows the transfer chamber (23) to be fully purged of gases, and the transfer chamber (23) to be completely filled with liquid, before the liquid inlet valve (27) closes. These operating features will be explained in further detail below.

The liquid outlet (29) is in the form of a port or a passage that connects the lower region of the transfer chamber (23) with the siphon system (13). As noted above, flow through the liquid outlet (29) is controlled by the liquid outlet valve (31). The liquid outlet valve (31) is a float operated valve, and is operated by the second floatation device (61).

The liquid outlet valve (31) includes a resilient valve member (57) in the form of a rubber or elastomeric washer. The valve member (57) is configured to produce a water tight seal when mated with a valve seat (59) situated in the liquid outlet port or passage (29). The liquid outlet valve member (57) is connected to, and is operated by, the second floatation device (61).

The second floatation device (61) is a float operated mechanism. The second floatation device (61) includes an outlet valve floatation device (63) and a vertically aligned piston guide cylinder or tube (65). In this example, the outlet valve floatation device (63) is in the form of a single cylindrical shaped float or piston and is configured to rise and fall within the vertically aligned piston guide cylinder (65). The piston guide cylinder (65) can be said to be a first guide of the vacuum pump (11). The resilient valve member (57) forms a part of a base of the piston (63).

With reference to FIGS. 3 to 6, it can be seen that the vacuum pump (11) is arranged in such a way that a conduit (67) of the pressurised liquid inlet (25) is configured to direct incoming liquid directly onto an upper surface (69) of the cylindrical shaped float or piston (63). Also, the tube of the piston guide (65) includes upper liquid transfer ports or guide outlet passages (71) that are configured to allow the incoming liquid to flow into the remainder of the interior of the transfer chamber (23) at a controlled rate. That is, the liquid transfer ports (71) comprise a series of relatively small holes all situated in a substantially horizontal plane in an upper region of the piston guide (65), and are sized to ensure that there is a slightly higher pressure in the liquid just above the upper surface (69) of the cylindrical shaped float (63) when the liquid inlet valve (27) is open.

The liquid transfer ports (71) are positioned such that flow through them is impeded until the cylindrical shaped float (63) has been forced down to close the liquid outlet valve (31). It is only when the cylindrical shaped float (63) is fully down that flow through the liquid transfer ports (71) is fully open. This configuration ensures that the liquid outlet valve (31) becomes closed when the liquid inlet valve (27) is opened, and helps to keep the liquid outlet valve (31) closed while the transfer chamber (25) is being filled via the pressurised liquid inlet (25).

The location, number and size of the liquid transfer ports (71) is carefully designed so as prevent water from escaping from the interior of the cylinder (65), until such time as the piston (63) has been depressed and sealed onto the liquid outlet valve member (57). Only then do the liquid transfer ports (71) allow the water to escape from the cylinder (65) and into the interior of the transfer chamber (23). The size and quantity of the liquid transfer ports (71) is deliberately selected to ensure that adequate pressure remains inside the cylinder (65) so that the piston (63) is held submerged in spite of its buoyancy.

The tube of the piston guide (65) is mounted centrally onto the part conical bottom end (14b) of the housing (14), and is situated immediately above the liquid outlet passage (29) and includes lower liquid transfer ports or passages (72) that are configured to allow liquid in the interior of the transfer chamber (23) to escape out through the lower part of the tube of the piston guide (65), and through the liquid outlet passage (29), when the liquid outlet valve (31) is opened.

It is worth noting at this point that the vacuum pump (11) must be oriented as illustrated in the figures to work properly, that is, with the float guides aligned substantially vertically so that the floatation devices (43) and (61) can move freely, to allow correct or efficient operation of the pump (11).

The conduit (67) of the liquid inlet includes at least one bleed hole (not shown) in an upper part of the conduit (67) to allow any entrapped gases or air in the conduit (67) to escape. Ensuring that no air is entrapped inside the conduit (67) is important when using the vacuum pump to obtain vacuums near to an absolute vacuum, for example a vacuum approaching ninety nine percent of an absolute vacuum.

The vacuum pump (11) further includes at least one equalisation port or passage (73) that is configured to allow the pressure in the liquid in the transfer chamber (23) adjacent the liquid outlet valve (31) to equalise with the pressure in the siphon system (13) when the liquid inlet valve (27) is closed and immediately before the liquid outlet valve (31) opens. In this example, the vacuum pump (11) has two equalisation ports (73). FIG. 9 shows two small streams or jets of liquid (81) flowing out through the equalisation ports (73) and into the siphon system (13).

The equalisation ports (73) allow the pressure within the transfer chamber (23) to drop to the usually lower pressure within the siphon system (13) when the liquid inlet valve (27) closes. Prior to pressure equalisation, the dominant force on the piston (63) is usually the vacuum within the siphon system (13) which sucks the valve member (57) down onto the valve seat (59). This vacuum force prevents the piston (63) from lifting the valve member (57) off the valve seat (59). It is only when the pressure on both sides of the valve seat (59) are equalised, or are almost equalised, that the buoyancy of the piston (63) begins to dominate, and then the piston (63) can lift the valve member (57) off the valve seat (59), to open the liquid outlet valve (31). This opening of the liquid outlet valve (31) then allows liquid to transfer out of the transfer chamber (23) and into the siphon system (13), as shown in FIG. 10.

It can be seen in FIGS. 11 to 13 that the gas inlet (37) includes a snorkel tube or passage (75) having a lower end (77) and an upper end (79). The lower end (77) is in communication with, or is open to, the siphon system (13), and the upper end (79) is located in, and is open to, an upper region of the transfer chamber (23). The gas inlet valve (39) is located within the upper end (79) of the passage, and is a one-way pressure operated valve, or a check valve, that is configured to open when pressure within the siphon system (13) exceeds the pressure within the upper region of the transfer chamber (23).

The gas outlet (37) is in communication with, or is open to, an upper part of the inside of the transfer chamber (23) and is configured to vent gases to atmosphere. The gas outlet valve (35) is also a one-way pressure operated valve, or a check valve, and is configured to open when pressure within the transfer chamber (23) exceeds the pressure outside the transfer chamber (23), which in most situations will be atmospheric pressure.

Operation

The operation of the vacuum pump (11) can be broadly described as follows. The vacuum pump (11) can be described as a purging or pumping apparatus that has a housing defining a transfer chamber (23). The transfer chamber (23) has a gas venting means and is connectable to an external pressurized fluid supply. The transfer chamber (23) is also connectable to a pipe or system (13) that is to be purged or pumped, in such a manner that the transfer chamber (23) communicates with a part of the pipe or system that is to be purged or pumped. And the communication between the transfer chamber (23) and the pipe or system (13) allows gases from the pipe or system (13) to transfer into the transfer chamber at the same time that liquid from within the transfer chamber (23) flows into the pipe or system under the force of gravity. In this way, gases in the pipe or system (13) are replaced with a liquid, the gases typically being previously dissolved gases or air, and the liquid typically being water.

The apparatus is configured to repeat a two-stage purging or pumping process as follows;
- a first stage (or filling and purging stage) in which the communication between the transfer chamber (23) and the pipe or system (13) is temporarily closed and the pressurized fluid supply is used to fill or almost fill the transfer chamber (23) with liquid, thereby pushing all, or a greater part of, any gases within the transfer chamber (23) out of the transfer chamber (23) through the gas venting means, and
- a second stage (or transfer stage) in which the pressurised fluid supply and the gas venting means are closed, and in which gases from the pipe or system (13) are able to flow into the transfer chamber (23) while the liquid in the transfer chamber (23) flows under the force of gravity into the pipe or system (13).

The first stage is like a positive displacement pump, the rising water being the top of a piston that pushes against the gases in the transfer chamber (23) to positively push them out of the chamber. During the second stage, the transfer chamber (23) becomes part of the siphon system for a period of time and gases in the siphon system are exchanged for liquids under the influence of gravity.

The process automatically slows down when all the air or gases are extracted from the pipe or siphon system (13). For example, when being used to extract bubbles from a siphon system, the amount of time to complete the second stage will become quite long (often many hours) as the vacuum pump (11) waits until enough gases have accumulated to fill, or almost fill, the transfer chamber (23) with air, and then the pressurized water inlet valve (27) is opened to begin the first stage again. This is the idling phase shown in FIG. 14.

The filling and purging stage, and the transfer stage are explained in further detail as follows;

Stage 1: Filling and Purging Stage

The liquid inlet valve (27) is opened when the liquid level within the housing is, or falls below a predetermined low-level point in the transfer chamber (23), to allow the housing (14) to be filled with liquid. This is controlled and effected by the low-level trip weight (51). As noted above, when the liquid level drops sufficiently, the low-level trip weight (51) begins to emerge from the liquid, allowing its increasing relative weight to act on the second connecting rod (55) and to pull down with an increasing force on the lever arm (45). This situation is shown in FIG. 13. This causes the free end of the lever arm (45) to drop and to overcome the detent in the valve control mechanism (40), causing the liquid inlet valve (27) to snap open and allow pressurised liquid to enter the transfer chamber (23). This situation is shown in FIG. 3.

As can also be seen in FIG. 13, at the start of this process the piston (63) of the second floatation device (61) is situated high in the piston guide cylinder (65) and is covering the upper liquid transfer ports (71). Since the water cannot initially escape from the piston guide cylinder (65) which is closed at the top, apart from its connection to the water inlet conduit (67), both the static pressure and the dynamic pressure of the incoming liquid or water push on the top of the piston (63), overcoming its buoyancy, to move the piston (63) downwards to the location shown in FIG. 3.

When the piston (63) has been moved downwards to the location shown in FIG. 3, two things have changed. The upper liquid transfer ports (71) have now been opened, and the liquid outlet valve (31) has been closed since the valve member (57) on the base of the piston (63) is now pressed into contact with the first liquid outlet valve seat (59) (for location of these items refer to FIG. 10).

Once the upper liquid transfer ports (71) are opened, water flows from the piston guide cylinder (65) and into the transfer chamber (23). The dynamic pressure of the water flowing out of the water inlet conduit (67) and into the upper part of the piston guide cylinder (65) continues to be felt on the top surface of the piston (69), helping to hold the piston (63) down. The force that the incoming water imparts onto the top surface of the piston (69) is sufficient to hold the piston (63) down, and to keep the liquid outlet valve (31) closed, even as the buoyancy of the piston (63) increases as the water level in the transfer chamber (23) rises to cover the piston (63). Any partial vacuum pressure in the siphon system (13) also helps to draw the piston (69) down against the valve seat (59).

After a short time, the pressure of the incoming water causes the pressure within the transfer chamber (23) to increase above the pressure within the settling chamber (15). This causes the gas inlet valve (39) to close as shown in FIG. 3, and at the same time, the lower pressure in the settling chamber (15) of the siphon system (13) helps to suck the piston (63) onto the first liquid outlet valve seat (59).

In this configuration, the transfer chamber (23) is then filled by the incoming pressurised liquid, and the gases within the transfer chamber (23) are compressed by the rising upper surface of the liquid, as illustrated in FIGS. 5 and 6. The liquid is acting like an upwardly moving piston during this time to compress the gases above the top surface of the liquid.

When initially priming a siphon system (13), the transfer chamber (23) will be filled with air that is near atmospheric pressure, and that air will be pushed out of the transfer chamber (23) almost as soon as water begins entering the transfer chamber (23). But when purging a running siphon system, the gases that are received into the transfer chamber (23) will typically be at a lower pressure, and they will not be pushed out of the transfer chamber (23) until the liquid level is closer to the top of the transfer chamber (23) and the pressure of the gases has reached atmospheric pressure.

Once the gases have been compressed sufficiently to reach atmospheric pressure, or slightly above, the gas outlet valve (35) will open, as the pressure within the transfer chamber (23) begins to exceed local atmospheric pressure, as shown in FIG. 6. In this way the gases are purged from the interior of the transfer chamber (23) as they are pushed out through the gas outlet (33). The gas outlet valve (35) includes a large diameter round flap valve, and is very light and is sensitive to even a very small pressure differential. And for this reason, the gas outlet valve (35) opens as soon as the gases within the transfer chamber (23) exceed the local atmospheric pressure, and it also closes promptly and forms a tight seal when the pressure in the transfer chamber (23) later falls below the local atmospheric pressure.

When the liquid level within the transfer chamber (23) rises to a predetermined high-level point, which is preferably when the transfer chamber (23) is full or almost full of liquid, as shown in FIG. 7, it is time to close the liquid inlet valve (27). The liquid inlet valve (27) is closed by the inlet valve operating mechanism (41) soon after the high-level trip float (49) becomes completely submerged.

The now submerged high-level trip float (49) butts against the rapid flow trip umbrella (50) at the upper end of the first connecting rod (53), and moves the lever arm (45) upwards, but not far enough to overcome the 'off-to-on' detent in the valve control mechanism (40). The elevated position of the lever arm (45) means that the rapid flow trip umbrella (50) is now positioned very close to an inside surface of the conical top end (14a) of the housing (14). At about the same time, the liquid level reaches the top of the transfer chamber (23) and begins to gush through the gas outlet valve (35).

As liquid begins exiting the gas outlet (33), the liquid rushing past the rapid flow trip umbrella (50) draws the rapid flow trip umbrella (50) up into the apex of the conical top end (14a) of the housing (14). The rapid flow trip umbrella (50) is like a plug being drawn into a plughole by the exiting liquid. The complete submerging of the high-level trip float (49), the plugging effect, and a venturi effect as liquid rushes past the rapid flow trip umbrella (50) and out the gas outlet (33), gives the inlet valve operating mechanism (41) the extra upward force required to overcome the detent in the valve control mechanism (40) and allows the liquid inlet valve (27) to be moved to a closed configuration as shown in FIG. 8.

Stage 2: Transfer Stage

When the liquid inlet valve (27) is closed, the flow of liquid into the transfer chamber (23) stops as is shown in FIG. 8. The pressurising effect from the incoming pressurised liquid ends, and any residual pressure within the transfer chamber (23) is initially released as a spurt of water out of the gas outlet valve (35), and any residual pressure is released via the equalisation ports (73). The pressure within the transfer chamber (23) then drops below atmospheric pressure as a small amount of water continues to exit the transfer chamber (23) via the equalisation ports (73).

As a result of the pressure within the transfer chamber (23) dropping below the local atmospheric pressure, the gas outlet valve (35) closes. As noted above, the gas outlet valve (35) is a one-way valve, and it is very sensitive, and it only takes a minute pressure differential to close the flapper valve, allowing a vacuum to form in the transfer chamber (23).

And since the flow of liquid into the transfer chamber (23) has stopped, the pressure on the upper surface (69) of the piston (63) reduces. At the same time, the equalisation ports (73) are allowing the pressure on each side of the liquid outlet valve (31) to equalise. (The liquid that escapes through the equalisation port (73) is illustrated as a jet of water (81) in FIG. 9.) The lower pressure within the siphon system (13) had been sucking the valve member (57) onto the valve seat (59), but now with the pressures in both the transfer chamber (23) and the settling chamber (15) equalised, this suction effect is eliminated.

The cylindrical float or piston (63) is now able to rise upwards due to its buoyancy within the surrounding water, lifting the valve member (57) from the valve seat (59) as shown in FIG. 10. This allows liquid to flow through the liquid outlet (29). As noted above, the piston guide (65) includes additional holes or ports in the lower part of the piston guide (65) that allow the liquid to flow freely toward the liquid outlet (29) which is situated within the space defined by the lower regions of the piston guide (65). In this way, the piston (63) is largely above and out of the flow path of the liquid and its buoyancy is able to keep it out of the way of the exiting liquid.

When the liquid outlet valve (31) is open, the inside of the transfer chamber (23) effectively becomes a part of the siphon system (13) and adopts the pressure within the part of the siphon system (13) to which it is connected. And as the liquid drains out of the transfer chamber (23) and into the siphon system (13) the pressure within the upper part of the transfer chamber (23) becomes slightly less than the pressure in the siphon system immediately below the transfer chamber (23) due to the head differential. This pressure difference, along with the buoyancy of the gases within the settling chamber (15) of the siphon system (13), causes the gas inlet valve (39) to open, as shown in FIG. 11. The gas outlet valve (35) remains closed at this time because there is a partial vacuum in the transfer chamber (23).

During the second stage the liquid level drops as the liquid drains downwards and into the siphon system (13), and gases from the siphon system (13) rise at the same time and are transferred into the transfer chamber (23) via the gas inlet passage (75), as illustrated in FIG. 12.

This continues until the water level reaches the predetermined low-level point mentioned above, and then stage 1 begins again. In this way, the vacuum pump (11) can continue to cycle through stage 1 and stage 2 repeatedly without any manual intervention, and without any external control system.

When priming a dry siphon system, or a dry pump inlet pipe, this sequence will repeat relatively quickly, with each stage typically taking in the region of five to thirty seconds depending on the pressures and sizes of the valves etc., compared to the volume of the transfer chamber (23).

But when the vacuum pump is being used to maintain prime in a siphon system, that is to remove any accumulating air or gas bubbles, as shown in FIG. 14, the second stage may occur very slowly, for example it may take one to two hours, or even half a day, depending on the circumstances, to complete stage 2, and then just ten seconds to repeat stage 1. This phase is referred to as the idling phase. The circumstances affecting the time to complete stage 2 can include the maximum rise of the siphon system, the size of the pipework and the flow rates through the siphon system.

In FIG. 14 it can be seen that a lower part of the liquid outlet (29) includes a first float ball (95) that is held captive within a cage of the liquid outlet (97). In the idling phase, the settling chamber (15) is partly full of liquid, and the first float ball (95) has floated on the liquid within the settling chamber (15) and up to a second liquid outlet valve seat (96) within the liquid outlet (29), effectively sealing the liquid outlet (29) and preventing floating debris from the siphon system (13) from rising up through the liquid outlet (29) and fouling or compromising the operation of the vacuum pump (11).

The first float ball (95) also helps to prevent a reverse flow of liquid back into the transfer chamber (23), in a situation where the pressure in the siphon system changes rapidly, for example a pressure surge or water hammer event caused by the full or partial closure of a valve in the siphon system, or a rapid decompression event in the vacuum pump or in the siphon. The first float ball (95) is not intended to be a part of the liquid outlet valve (31).

Similarly, a lower part of the gas inlet (37) includes a second float ball (99) that is held captive within a cage of the gas inlet (101). In the idling phase, the second float ball (99) has also floated on the liquid within the settling chamber (15) and up to a second gas inlet valve seat (98) within the gas inlet (37), effectively sealing the gas inlet (37) and preventing floating debris from the siphon system (13) from rising through the gas inlet (37) and fouling or compromising the operation of the vacuum pump (11).

The first float ball (95) has a lower density than the second float ball (99). In this example the first float ball (95) has a density similar to a ping pong ball, and the second float ball (99) is made of rubber. This difference in density is advantageous in that as the liquid level in the settling chamber (15) falls, the second float ball (99) falls first, ensuring that the gas inlet passage (75) is opened first. If the first float ball (95) dropped first, the second float ball (99) could remain stuck to the gas inlet valve seat (97) as water from the transfer chamber (23) rushes into the settling chamber (15) causing the water level to rise.

Water is lost through the equalisation ports (73) during the whole time that the vacuum pump is in Stage 1. But in the normal course of events the time that the vacuum pump (11) is in stage 1 is usually quite small, and the volume of water lost in this way is relatively small. For this reason, no attempt has been made to eliminate the need for the equalisation ports (73) by other means which may introduce reliability issues. Simple equalisation ports (73) in the form of one-to-three millimetre diameter jets or holes are considered the most effective and reliable way of equalising the pressures, when required, to allow the liquid outlet valve (31) to open.

In practice, the equalisation ports (73) can be in the form of removable nozzles or jets, that can be removed for cleaning, or to be replaced with nozzles or jets of another size.

Additional Notes Regarding the Configuration of the Vacuum Pump (11)

During testing it has been noted that the efficiency of the vacuum pump (11) can be improved significantly by minimizing or eliminating as many air pockets as possible from within the transfer chamber (23). Air pockets can for example be provided in the gas outlet pipe or in a pressure gauge mounting pipe. Small air pockets expand greatly when the pressure within the transfer chamber (23) drops, taking up space that should be used by low pressure gases that are to be extracted from the siphon system (13) and into the transfer chamber (23). Because the vacuum pump (11) is capable of achieving vacuum pressures in the region of 0.02 atmospheres, even a tiny bubble or pocket of air remaining in the transfer chamber (23) when it has been filled with liquid causes a significant reduction in operating efficiency.

A mesh screen (83) can be fitted across the settling chamber (15), immediately below the liquid outlet (29) and the gas inlet (37), to help prevent solid material such as leaves and small twigs from blocking the gas inlet valve (39) or the liquid outlet valve (31).

In FIGS. 1 and 2 it can be seen that in practice, the low-level trip weight or sinker (51) has a vertical hole through it, and a second guide in the form of a vertically aligned rod (85), that is supported at its bottom end by the conical bottom end (14b), passes through the hole in the low-level trip weight or sinker (51). In this way the motion of the low-level trip weight or sinker (51) is guided and is limited to vertical motion.

In FIGS. 1 and 2 it can also be seen that the practical version of the vacuum pump (11) includes a valved maintenance connection (87) that is situated on the sloping walls of the conical bottom end (14b) of the housing (14). In this example the valved maintenance connection (87) includes a manually operated valve and is intended for use in draining liquid or air from the housing (14) for maintenance purposes, or alternatively for connecting a high-volume vacuum pump to the vacuum pump (11) to rapidly initially purge a large volume of air from a large siphon system. Alternatively, the valved maintenance connection (87) could be used to fill the housing (14) with water in which case air or gases could be purged out through the gas outlet valve (35).

An external water inlet valve (89) is also provided upstream of the internally mounted liquid inlet valve (27) to allow a pressurised water supply to be isolated from the vacuum pump (11) for maintenance or replacement purposes. Also, a vacuum gauge (91) that communicates with the inside of the transfer chamber (23) is provided to allow the operation of the vacuum pump (11) to be monitored. The vacuum gauge (91) is mounted on the conical top end (14a).

In FIGS. 1 and 2 it can also be seen that the conical bottom end (14b) includes a large internally threaded collar (93) that allows the vacuum pump (11) to be connected to the riser section (21) of the siphon system (13). The internally threaded collar (93) has a diameter in the order of one hundred to one hundred and fifty millimetres. A large o-ring is used within the internally threaded collar (93) to create a strong seal at the joint between the housing (14) and the riser section (21).

Variations

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

In the example described herein, the vacuum pump (11) is shown fitted to a siphon system (13), but it should be noted that the apparatus could be equally be connected to an inlet pipe of a pumping system to operate in the similar manner to help prime the inlet pipe and/or to eliminate any pockets of gases that may accumulate in the inlet pipe.

The apparatus described herein has been designed for use with system siphoning or pumping water, but it is envisaged that the apparatus could be used in systems siphoning or pumping almost any liquid.

It is envisaged that either as an addition to the cage of the liquid outlet (97) and the cage of the gas inlet (101), or as a replacement, it would be possible to install a mesh panel or grill across the bottom of the riser section (21) to stop debris from entering the liquid outlet (29) or the gas inlet (37). Such a mesh panel could be self-cleaned to some extent by the liquid flowing through the siphon system (13) or by the water flowing into the siphon system from the liquid outlet (29).

In the example described above the liquid valves are both float operated and the gas valves are both pressure operated. It is envisaged that in an alternative embodiment of the invention, any number of the valves could be controlled mechanically or electronically using pressure and/or level sensors and using powered actuators to operate the valves. In a further option, some or all of the valves could be manually operated.

Also, it is envisaged that while the liquid inlet valve is located inside the transfer chamber in the example described above, the liquid inlet valve could alternatively be located outside the transfer chamber.

It is envisaged that in most cases the transfer chamber, or the gas outlet, will be venting to atmosphere. However, in some applications it is possible that the gas outlet could be vented to another enclosed environment that is not necessarily at atmospheric pressure, for example when the gases have a bad odour, contain pollutants, or if the gases are flammable.

The piston guide (65) described in the example above is in the form of a cylindrical tube. It is envisaged that in an alternative embodiment that the piston guide (65) could take a number of forms, for example an array of external guide rods, or a central guide rod that is surrounded by the piston (63), or could be replaced by a pivoting lever to which the piston (63) is attached.

Also, it is envisaged that a very rudimentary version of the apparatus could include a transfer vessel with just a sealable opening at the top and a manually operated transfer valve at the bottom. The valve at the bottom could be closed, and a cap removed from the opening at the top of the vessel, and then water could be poured into the vessel through the opening until it is full. The vessel could then be re-sealed using the cap, and then the transfer valve is opened to allow the water in the vessel to displace any gases that form in the siphon pipe. And when the water level is low, the tap could again be closed, and the cap removed to allow the vessel to be re-filled. Ideally such a system would include a manually operated pressure relief valve so that the vacuum pressure within the vessel could be relieved before opening the cap.

In the example described herein, the inlet valve operating mechanism (41) includes a lever arm (43) which guides the motion of the floats and weights of the inlet valve operating mechanism (41). However, in an alternative configuration, it is envisaged that the inlet valve operating mechanism (41) could include a tube or linear guides that guide the motion of its floats and weights. Similarly, in place of a detented valve control mechanism a magnetically latched valve control mechanism could be employed.

In such a system, the transfer chamber could include a guide configured to allow substantially vertical movement of a floatation device that operates the liquid inlet valve. The guide could be in the form of a substantially vertically aligned tube having holes or passageways that allow the liquid level within the guide to match that within the remainder of the transfer chamber.

The floatation device could be in the form of an upper float, a lower float, and a ballast weight below the lower float, with these items all being fixed to a connecting rod. The upper float, the lower float and the ballast weight will perform the same function as the high-level trip float (49), the primary buoyancy float assembly (47) and the low-level trip weight (51) used in the example described herein. The floats and/or sinkers could be connected to their respective valves using cords or ropes, rather than connecting rods, as a further variation.

In an alternative configuration the high-level trip float (49) and the rapid flow trip umbrella (50) could be integrated into a single item, for example, an upper surface of the high-level trip float (49) could have a shallow conical shaped surface having a profile that is similar to, or matches, the conical top end (14a) of the housing.

In the example shown and described herein, the housing (14) is in the form of a cylinder having conical ends. It is envisaged that an alternative configuration could include domed ends, or the entire housing could have an elliptical, oval or egg shape. In addition, and instead of forming the housing in three parts, it is envisaged that the housing could be formed in two halves, with a single sealed joint approximately half way up the height of the housing.

In the example described above, the equalisation ports (73) are permanently releasing liquid and pressure. A further option would be to have equalisation ports (73) that can be sealed during the transfer chamber filling stage, and which could open when the transfer chamber (23) has been filled. For example, a force produced by the high influx of water into the cylinder (65) during the filling stage could be used to close a valve or valves associated with the equalisation ports (73). And when the flow of water subsided, the valves could be allowed to open under the influence of a spring or similar biasing mechanism.

If the liquid inlet valve was magnetically operated, like the operation of an Abertax™ style of valve, the floatation device could operate the liquid inlet valve via a magnetic coupling. A magnet attached to the top of the floatation device could interact with an iron rod that is a part of the liquid inlet valve, and which opens or closes the liquid inlet valve when the iron rod is pulled down by the magnet or is released.

The magnet could also interact with an iron ring situated on top of the chamber and below the valve, and which is situated about a plastic housing containing the iron rod. When the magnet is floated up by the floatation device, it initially carries the iron rod up with it without closing off the liquid inlet valve. But as the magnet moves higher the iron ring becomes within the influence of the magnet, and the magnet becomes progressively more attracted to the iron ring. Eventually the magnet lifts the floatation device up slightly, approximately two or three mm. The floatation device is then magnetically latched to the iron ring, and at the same time the iron rod is moved up and causes the liquid inlet valve to close.

This magnetic latching of the floatation device keeps the liquid inlet valve closed. The magnetic latching requires a certain amount of force to disconnect floatation device from the iron ring.

The lower float provides its full lifting force when it is completely submerged. However, as the water level drops and exposes the top of the lower float, the lifting force from the lower float decreases until it is only the magnetic latching at the top that is holding the first floatation device up, and which is keeping the liquid inlet valve closed. As the water level continues to drop, the ballast weight is exposed, allowing its weight to act in a downward direction, allowing the floatation device to break the magnetic latch and to fall.

In this way, a magnetically latched valve could be used in place of the detented valve of the present example, and a guide float and weight system could be used in place of a levered float and weight system.

Definitions

Throughout this specification the word "comprise" and variations of that word, such as "comprises" and "comprising", are not intended to exclude other additives, components, integers or steps.

Advantages

Thus, it can be seen that at least the preferred form of the invention provides a vacuum pump or a siphon or pump priming device which is able to;
  Create and maintain a vacuum of almost zero atmospheres with relative ease,
  Prime and maintain prime within a siphon system, even if the siphon system is a water siphon system having a siphon head that is close to ten metres,
  Prime and maintain prime in a pump inlet line, even when the pump is lifting water close to ten metres from the source of the water, and
  Prime and maintain prime within a siphon system of a wide range of lengths, diameters and volume flow rates, as the size of the device can be scaled up or down with relative ease, and it has a very low energy input requirement.

Testing using the apparatus described above has shown that the vacuum pump (11) is able to achieve a vacuum, or an absolute pressure in the order of 0.02 atmospheres. And interestingly, the vacuum pump (11) achieves this high-level of vacuum with relative ease and within a practical period of time. The inventor's experience has shown that many vacuum pumps struggle to operate efficiently below about 0.15 atmospheres, while this device just works steadily through its cycles, right down to extremely low pressures.

This makes the vacuum pump (11) capable of priming siphon systems or pump inlet pipes that are lifting water close to ten metres. It is anticipated that this device will open up numerous siphon drainage opportunities that are not only able to take advantage of the continuous de-aeration capabilities, but also the capability to continuously siphon over heights or siphon heads, and/or siphon distances, that have simply not been possible before.

In addition, the vacuum pump described herein is not damaged or destroyed in the same way that many conventional vacuum pumps are when they inadvertently draw in a small quantity of liquid. When priming a pump inlet, or removing gases from a siphon system, the chance of drawing in a small quantity of liquid is relatively high.

The invention claimed is:

1. A vacuum pump for removing gases from a system, the vacuum pump comprising:
  a transfer chamber,
  a pressurised liquid inlet configured to allow pressurised liquid to enter the transfer chamber, wherein the pressurised liquid inlet is controlled by a liquid inlet valve,
  a liquid outlet configured to allow liquid to be transferred from the transfer chamber and into the system, wherein the liquid outlet is controlled by a liquid outlet valve,
  a gas outlet configured to allow gases to be expelled from the transfer chamber, wherein the gas outlet is controlled by a gas outlet valve, and
  a gas inlet configured to allow gases to enter the transfer chamber from the system,
  wherein the gas inlet is controlled by a gas inlet valve,
  wherein:
    the vacuum pump is configured such that the liquid outlet and the gas inlet are in communication with the system from which gases are to be removed;
    the liquid outlet valve is operated by at least one outlet valve flotation device;
    the vacuum pump is configured such that pressurised liquid entering the transfer chamber via the pressurised liquid inlet is directed onto an upper surface of the outlet valve flotation device; and
    the liquid inlet valve comprises a valve control mechanism that is operated by an inlet valve operating mechanism, and the inlet valve operating mechanism comprises at least one float operatively connected to the valve control mechanism, wherein the inlet valve operating mechanism comprises:
      a high-level float situated at or adjacent an upper part of the transfer chamber, a low-level sinker or weight situated at or adjacent a lower part of the transfer chamber, and
      a primary buoyancy float or float assembly situated between the high-level float and the low-level sinker or weight.

2. The vacuum pump as claimed in claim 1, wherein the system is a siphon system.

3. The vacuum pump as claimed in claim 1, wherein the liquid outlet valve is located in a lower region of the transfer chamber.

4. The vacuum pump as claimed in claim 1, wherein the liquid outlet valve comprises:
  a resilient valve seat, and
  a valve member configured to produce a liquid or water tight seal when mated with the valve seat.

5. The vacuum pump as claimed in claim 1, wherein the at least one outlet valve floatation device comprises a piston.

6. The vacuum pump as claimed in claim 5, wherein the piston is substantially positively buoyant.

7. The vacuum pump as claimed in claim 1, wherein the vacuum pump further comprises a first guide or guide assembly configured to allow substantially vertical movement of the at least one outlet valve floatation device.

8. The vacuum pump as claimed in claim 7, wherein the first guide or guide assembly comprises a substantially vertically aligned tube configured to guide the outlet valve flotation device.

9. The vacuum pump as claimed in claim 8, wherein the tube of the first guide or guide assembly defines at least one upper liquid transfer port configured to allow incoming liquid to flow into an interior of the transfer chamber.

10. The vacuum pump as claimed in claim 8, wherein the tube of the first guide or guide assembly defines at least one lower liquid transfer port configured to allow liquid in an interior of the transfer chamber to flow into the liquid outlet.

11. The vacuum pump as claimed in claim 1, wherein the valve control mechanism is a detented control mechanism.

12. The vacuum pump as claimed in claim 1, wherein the high-level float and the primary buoyancy float or float assembly are operatively connected to the valve control mechanism via at least one lever.

13. The vacuum pump as claimed in claim 1, wherein the gas inlet comprises a riser passage having a lower end and an upper end, the lower end of the riser passage being in communication with the system, and the upper end of the riser passage being located in an upper region of the transfer chamber.

14. The vacuum pump as claimed in claim 1, wherein the vacuum pump further comprises at least one equalisation port or passage configured to allow a pressure-within the transfer chamber to equalise to a pressure within the system when the liquid inlet and liquid outlet are closed.

15. A vacuum pump for removing gases from a system, the vacuum pump comprising:
a transfer chamber,
a pressurised liquid inlet configured to allow pressurised liquid to enter the transfer chamber, wherein the pressurised liquid inlet is controlled by a liquid inlet valve,
a liquid outlet configured to allow liquid to be transferred from the transfer chamber and into the system, wherein the liquid outlet is controlled by a liquid outlet valve,
a gas outlet configured to allow gases to be expelled from the transfer chamber, wherein the gas outlet is controlled by a gas outlet valve, and
a gas inlet configured to allow gases to enter the transfer chamber from the system, wherein the gas inlet is controlled by a gas inlet valve,
wherein:
the vacuum pump is configured such that the liquid outlet and the gas inlet are in communication with the system from which gases are to be removed;
the liquid outlet valve is operated by at least one outlet valve flotation device;
the vacuum pump is configured such that pressurised liquid entering the transfer chamber via the pressurised liquid inlet is directed onto an upper surface of the outlet valve flotation device; and
the vacuum pump further comprises at least one equalisation port or passage configured to allow a pressure within the transfer chamber to equalise to a pressure within the system when the liquid inlet and liquid outlet are closed.

16. The vacuum pump as claimed in claim 15, wherein the liquid inlet valve comprises a valve control mechanism that is operated by an inlet valve operating mechanism, and the inlet valve operating mechanism comprises at least one float operatively connected to the valve control mechanism, wherein the inlet valve operating mechanism comprises:
a high-level float situated at or adjacent an upper part of the transfer chamber,
a low-level sinker or weight situated at or adjacent a lower part of the transfer chamber, and
a primary buoyancy float or float assembly situated between the high-level float and the low-level sinker or weight.

17. A vacuum pump for removing gases from a system, the vacuum pump comprising:
a transfer chamber,
a pressurised liquid inlet configured to allow pressurised liquid to enter the transfer chamber, wherein the pressurised liquid inlet is controlled by a liquid inlet valve,
a liquid outlet configured to allow liquid to be transferred from the transfer chamber and into the system, wherein the liquid outlet is controlled by a liquid outlet valve,
a gas outlet configured to allow gases to be expelled from the transfer chamber, wherein the gas outlet is controlled by a gas outlet valve, and
a gas inlet configured to allow gases to enter the transfer chamber from the system, wherein the gas inlet is controlled by a gas inlet valve,
wherein:
the vacuum pump is configured such that the liquid outlet and the gas inlet are in communication with the system from which gases are to be removed;
the liquid outlet valve is operated by at least one outlet valve flotation device;
the vacuum pump is configured such that pressurised liquid entering the transfer chamber via the pressurised liquid inlet is directed onto an upper surface of the outlet valve flotation device;
the at least one outlet valve floatation device comprises a piston;
the piston is substantially positively buoyant: and a force exerted by the pressurised liquid directed onto the upper surface of the outlet valve flotation device is sufficient to overcome the substantially positive buoyancy of the piston.

18. The vacuum pump as claimed in claim 17, wherein the liquid inlet valve comprises a valve control mechanism that is operated by an inlet valve operating mechanism, and the inlet valve operating mechanism comprises at least one float operatively connected to the valve control mechanism, wherein the inlet valve operating mechanism comprises:
a high-level float situated at or adjacent an upper part of the transfer chamber,
a low-level sinker or weight situated at or adjacent a lower part of the transfer chamber, and
a primary buoyancy float or float assembly situated between the high-level float and the low-level sinker or weight.

19. A vacuum pump for removing gases from a system, the vacuum pump comprising:
a transfer chamber,
a pressurised liquid inlet configured to allow pressurised liquid to enter the transfer chamber, wherein the pressurised liquid inlet is controlled by a liquid inlet valve,
a liquid outlet configured to allow liquid to be transferred from the transfer chamber and into the system, wherein the liquid outlet is controlled by a liquid outlet valve,
a gas outlet configured to allow gases to be expelled from the transfer chamber,
wherein the gas outlet is controlled by a gas outlet valve, and
a gas inlet configured to allow gases to enter the transfer chamber from the system,
wherein the gas inlet is controlled by a gas inlet valve;
wherein the vacuum pump is configured such that the liquid outlet and the gas inlet are in communication with the system from which gases are to be removed; and
wherein the vacuum pump further comprises at least one equalisation port or passage configured to allow a pressure in the area adjacent the liquid outlet valve to equalise with a pressure in the system while the liquid outlet valve is closed.

\* \* \* \* \*